(12) United States Patent
Ramones et al.

(10) Patent No.: US 8,587,450 B2
(45) Date of Patent: Nov. 19, 2013

(54) METHOD AND APPARATUS FOR DISPLAYING SYSTEM STATUS WITH A WIDE RANGE OF VIEWING ANGLE

(75) Inventors: John Kui Yin Ramones, San Ramon, CA (US); Tiffany Ming Tsao, Saratoga, CA (US); Jonathan Alexander Matheson, Sunnyvale, CA (US)

(73) Assignee: Netgear, Inc., San Jose, CA (US)

( * ) Notice: Subject to any disclaimer, the term of this patent is extended or adjusted under 35 U.S.C. 154(b) by 126 days.

(21) Appl. No.: 13/330,313

(22) Filed: Dec. 19, 2011

(65) Prior Publication Data

US 2012/0098651 A1   Apr. 26, 2012

Related U.S. Application Data

(63) Continuation-in-part of application No. 12/554,281, filed on Sep. 4, 2009.

(51) Int. Cl.
*G08B 5/00* (2006.01)
(52) U.S. Cl.
USPC ...................................... 340/815.4; 370/342

(58) Field of Classification Search
USPC ................ 340/815.4, 540, 815.43, 815.55; 370/345
See application file for complete search history.

(56) References Cited

U.S. PATENT DOCUMENTS 7,190,268 B1 * 3/2007 Rad et al. .................... 340/540

* cited by examiner

*Primary Examiner* — Shirley Lu
(74) *Attorney, Agent, or Firm* — James M. Wu; JW Law Group

(57) ABSTRACT

A network device and method for improving performance monitoring capabilities using wide view angle indicators are disclosed. The network device or system, in one embodiment, includes a first plate, a second plate, and a first light source. The first plate includes an edge lip or lip containing a graphic viewing surface. Various ultraviolet ("UV") inked icons indicating functional performance are inscribed in or on the graphic viewing surface. The second plate is situated substantially perpendicular to the first plate, wherein an edge of the second plate is positioned adjacent to the graphic viewing surface. The first light source is configured to selectively project a UV light onto at least a portion of the graphic viewing surface to active at least one UV inked icon.

6 Claims, 22 Drawing Sheets

Section B-B

METHOD AND APPARATUS FOR DISPLAYING SYSTEM STATUS WITH A WIDE RANGE OF VIEWING ANGLE

PRIORITY

The present application is a continuous in part (CIP) application of co-pending U.S. patent application Ser. No. 12/554,281, entitled "Wide Viewing Angle Indicators for Network Devices", filed on Sep. 4, 2009, hereby incorporated into the present application by reference.

CROSS-REFERENCE TO RELATED APPLICATIONS

The present application contains subject matter that may be related to the subject matter in U.S. application Ser. No. 13/330,245 entitled: "METHOD AND APPARATUS FOR DISPLAYING SYSTEM STATUS WITH A WIDE RANGE OF VIEWING ANGLE", filed on Dec. 19, 2011.

BACKGROUND

A high-speed network environment typically includes network devices such as routers and switches used for facilitating delivery of information packets and/or data traffic from source devices to destination devices via communication networks such as IP and/or packet-based networks. Information pertaining to the transfer of data packet(s) and/or frame(s) through the network(s) is usually embedded within the packet and/or frame itself. Each packet, for instance, traveling through multiple nodes via one or more communication networks such as Internet and/or Ethernet can typically be handled independently from other packets in a packet stream or traffic. Each node which may include routing, switching, and/or bridging engines processes incoming packet(s) or frame(s) and determines where the packet(s) or frame(s) should be forwarded.

A typical modern local area network ("LAN") includes various types of networks such as a home area network ("HAN"), a residential LAN, and/or a network gateway used for connecting multiple network devices within an enclosure like a building or home. Devices can be computers, printers, Internet connections, servers, televisions, gaming units, and the like. With increasing popularity of home networking and triple play services (voice, video and data), high-speed computing network devices for handling information such as IPTV (Internet Protocol Television) are in demand. A network switch for HAN, for example, can operate over existing wiring, such as coax cables or power lines, for transmitting network information.

With increasing capabilities of a typical network device, managing and monitoring network performance have become increasingly difficult. A problem associated with a typical network device is limited viewing and/or monitoring performance of functional icons on the device. For example, current LED indicators are typically shown on one vertical surface by illuminating a functional icon which has limited viewing angle. When a user moves toward the device (router or switch), the viewing angle of the illuminated icon becomes acute and the icons are difficult to observe.

SUMMARY

A device and method for improving performance monitoring capabilities using wide view angle indicators are disclosed. A device includes a network device, a multimedia device, a handheld device, a gaming device, and the like. The network device or system, in one embodiment, includes a first plate, a second plate, and a first light source. The first plate includes an edge lip or lip containing a graphic viewing surface. Various ultraviolet ("UV") inked icons indicating functional performance are inscribed in or on the graphic viewing surface. The second plate is situated substantially perpendicular to the first plate, wherein an edge of the second plate is positioned adjacent to the graphic viewing surface. The first light source is configured to selectively project a UV light onto at least a portion of the graphic viewing surface to active at least one UV inked icon.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
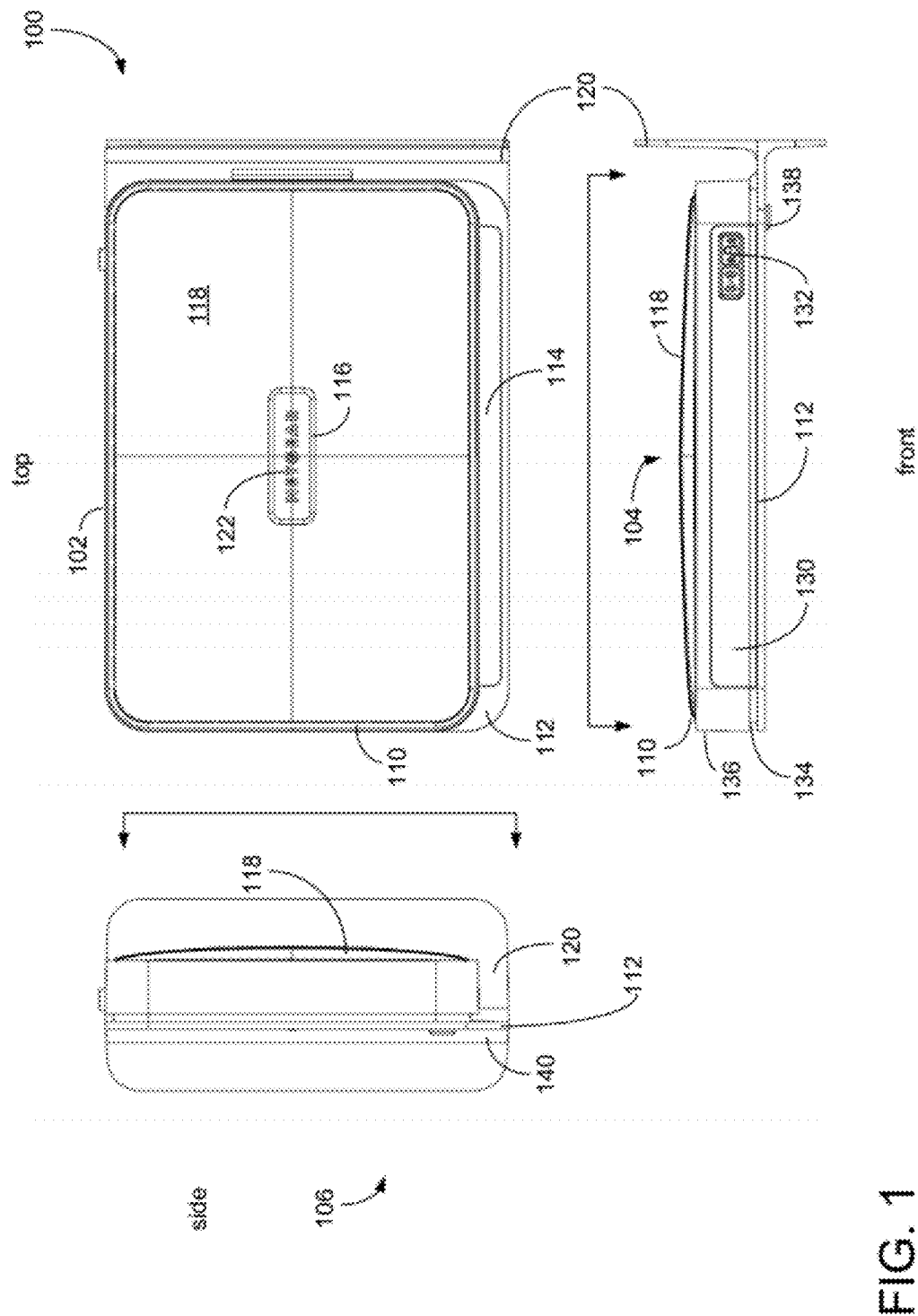
FIG. 1 is a two-dimensional ("2D") diagram illustrating a structural layout of a network device having a wide viewing angle for performance management in accordance with one embodiment of the present invention.

Exemplary embodiment(s) of the present invention is described herein in the context of a method, device, and apparatus of improving performance monitoring using wide angle viewing capabilities.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items A network device such as a switch or a router includes a first plate, a second plate, and a light source. The first plate has multiple performance indicators situated at one side of the network device. The second plate has multiple performance indicators wherein the second plate is situated at a surface having a predefined angle with respect to the first plate. The performance indicators on the first plate, in one embodiment, are the same indicators as the performance indicators on the second plate. The light source or apparatus, which includes at least one light emitting diode ("LED") and optical element(s), is capable of generating two illuminating beams. Optical elements, including optical lens, optical panel(s), optical channel, are capable of directing, converting, and splitting optical light. The first illuminating beam illuminates a portion of device performance viewable opposite from the first plate and the second illuminating beam illuminates a first portion of device performance viewable opposite from the second plate. The term "viewable opposite from the first plate" means that a user or observer directly or indirectly faces the first plate and sees the light illuminating from the first plate. Similarly, the term "viewable opposite from the second plate" has the similar meaning as the term "viewable opposite from the first plate."

FIG. 1 is a two-dimensional ("2D") diagram 100 illustrating a structural network device having a wide viewing angle for displaying device status in accordance with one embodiment of the present invention. Diagram 100 illustrates a top view 102, a front view 104, and a side view 106 of the device. Side view 106, in one example, shows the device in a standing orientation while front view 104 shows the device in a desktop or horizontal orientation. Diagram 100 essentially illustrates a structural enclosure or case with a removable stand 120 wherein the case is configured to house a network device, such as a switch, router, wireless gateway, hub, bridge, and the like. It should be noted that the underlying concept of the exemplary embodiment(s) of the present invention would not change if one or more elements were added to or removed from diagram 100.

Top view 102 of the device includes a cover 118, a removable stand 120, and a lip 112, wherein lip 112 further includes a first plate or an icon plate 114. Cover 118, which can also be called a top lid, top side, et cetera, includes a logo area 122, a top vent 116, and an edge vent 110. While vents 110 and 116 provide a cooling function for heat dissipation, logo area 122 facilitates or hosts a trader mark logo such as NETGEAR™.

It should be noted that logo area 122, which is currently located at the center top section, can be moved anywhere on the case. Icon plate 114, in one embodiment, indicates device performance using various performance icons or indicators with partial diffused illumination areas.

For example, icon plate 114 includes an on-off icon, "2.4 GHz" icon, "5 GHz", "1" icon, "2" icon, "3" icon, "4" icon, and so on. While 2.4 GHz and 5 GHz icons indicate the speed of the data transmission, 1-4 icons, for example, indicate the status of network connections. Each icon may have at least one associated light source, wherein activities of light beams generated by the light source indicate the status or performance of the associated icon. For instance, when the light beam associated with "2" icon is lit, it indicates that the network connection or channel 2 connection is active or connected. In addition, if the light beam(s) associated with 2.4 GHz is blinking or flashing, it indicates that the current data transmission is 2.4 billion cycles per second.

Front view 104 of the device shows a front viewing perspective including cover 118, edge vent 110, wall 136, stand 120, lip 112, and a front icon plate 130. Similar to icon plate 114, front icon plate 130, in one embodiment, indicates device performance using various status icons with partial diffused illumination areas. Front icon plate 130 also includes one or more switches 132 used to turn on and/or off the device. Front view 104 of the device further includes an optical channel 134 and an interlock element 138. Channel 134, in one embodiment, is situated between lip 112 and front icon plate 130 for guiding and facilitating diffused illumination generated by optical beams. Interlock element 138 can be a lock or an anchoring system used for fastening or attaching removable stand 120 to the device whereby the device can be placed in a more desirable orientation.

Side view 106 of the device shows a side viewing perspective having cover 118, stand 120, and a bottom side 140, wherein bottom side 140 includes an edge or lip 112. Side view 106 can also be viewed as a top view when the device is in vertical or standing position. It should be noted that cover 118 has a parabolic curve, which provides aesthetic appearance as well as functional application(s). A functional application, for instance, can be heat dissipation. For example, when the device is in horizontal or desktop position, the heat generated by various internal components accumulates at the tip of parabolic curve of cover 118 whereby top vent 116 can dissipate heat or hot air via its openings.

Icon plate 114 is situated at one side of device and front icon plate 130 is situated at a surface having a predefined angle with respect to icon plate 114. The predefined angle, in one example, is 90 degree. Alternatively, the predefined angle can have an angle any where between 10 degree and 170 degree. In one embodiment, the plates are structured by transparent or semitransparent optical materials capable of facilitating one or more diffused illumination areas for performance indicators. The performance indicators on both plates may be the same indicators.

The light source, in one embodiment, guided by an optical guiding channel, generates a first illuminating beam and a second illuminating beam, wherein the first illuminating beam illuminates a first portion of device performance viewable opposite from the first plate (or icon plate) 114 and the second illuminating beam illuminates a first portion of device performance viewable opposite from the second plate (or front icon plate) 130. The device can include a second light source which is also capable of generating two illuminating beams, wherein the first illuminating beam of the second light source illuminates a second portion of device performance viewable opposite from the first plate and the second illuminating beam of the second light source illuminates a second portion of device performance viewable opposite from the second plate.

The optical guiding channel creates a groove between the first plate and the second plate. An optical diffuser, coupled with the optical guiding channel, is configured to generate at least one area of diffused illumination in response to light generated by the first light source. A removable stand 120 is able to attach itself to a third side of the network device for facilitate placing the network device in a vertical position.

An advantage of using the embodiment(s) of the illustrated device is to enhance device capabilities for performance monitoring and/or displaying with wide viewing angles.

Figure 2A:
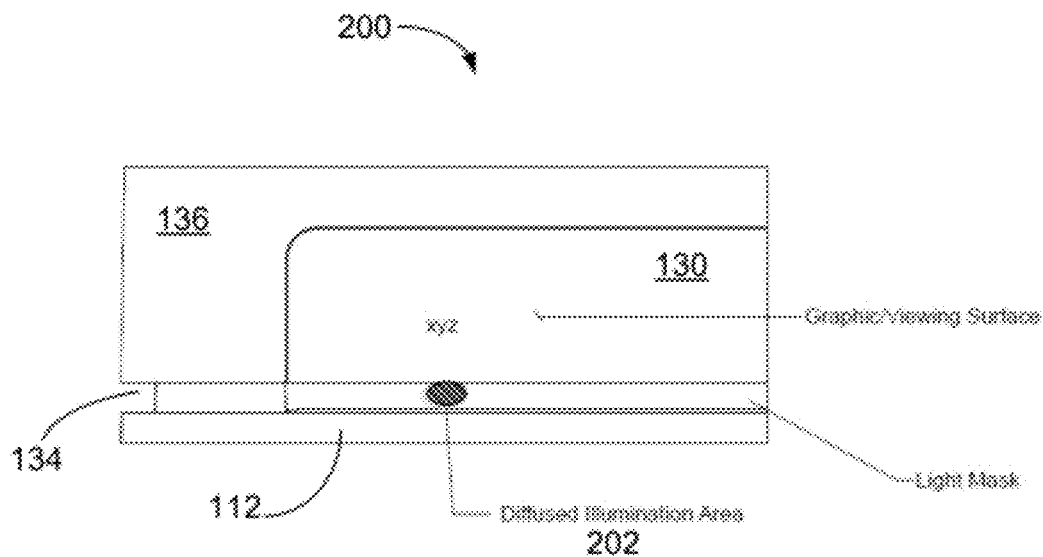
FIG. 2AB illustrate portions of network device having diffused illumination areas in accordance with one embodiment of the present invention.

FIG. 2A illustrates a portion of front view for a network device 200 having a diffused illumination area in accordance with one embodiment of the present invention. Device 200 includes wall 136, optical channel 134, lip 112, and diffused illumination area 202, wherein wall 136 can also be referred to as a side of housing. Diffused illumination area 202 is generated by a light source, not shown in FIG. 2A, and is viewable opposite from wall 136. It should be noted that the underlying concept of the exemplary embodiment(s) of the present invention would not change if one or more elements were added to or removed from diagram 200.

Wall 136, in one embodiment, includes a front icon plate 130 which is a graphic/viewing surface having one or more icons. Icons, which are also known as markers or indicators, are used to indicate device status or performance when the associated diffused illumination areas are activated. For example, when diffused illumination area 202 is lit or activated, it indicates that network connection "xyz" is active.

Optical channel 134 is formed between lip 112 and wall 136 used for guiding the light beam(s). Optical channel 134, in one embodiment, includes a light mask which is capable of creating and/or facilitating one or more diffused illumination areas. The diffused illumination areas associated with icon(s) on icon plate 130 are viewable opposite from front icon plate 130. A light mask is used to collimate optical light to a specific or predefined area and also control and/or prevent light spreading to other portions of the graphical viewing interface.

Figure 2B:
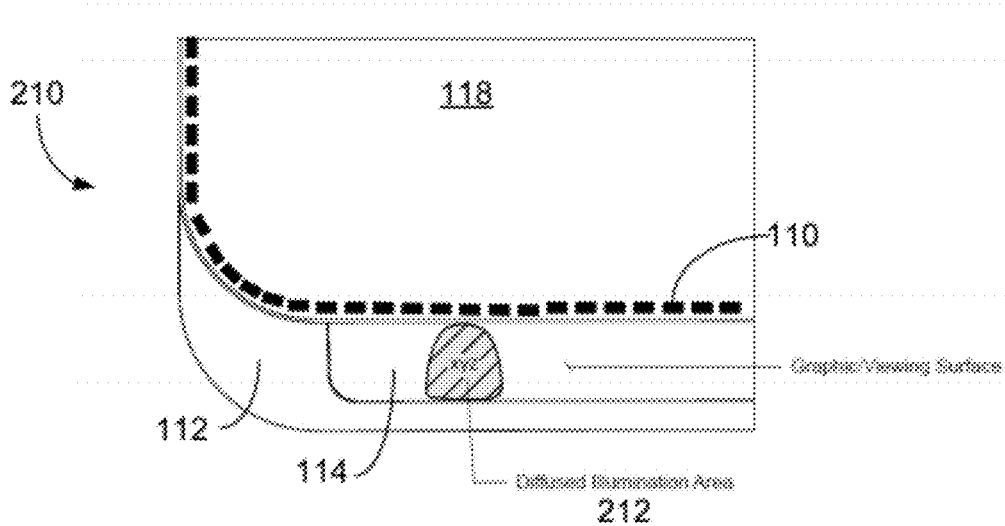

FIG. 2B illustrates a portion of top view of network device 210 having a diffused illumination area in accordance with one embodiment of the present invention. Device 210 includes cover 118, edge vent 110 with a pattern, lip 112, and a diffused illumination area 212. Diffused illumination area 212 is generated by a light source, not shown in FIG. 2B, and is viewable opposite from lip 112. Edge vent 110 situated at the edge of cover 118 provides heat dissipation for temperature control. In one embodiment, FIG. 2B illustrates a top view of device shown in FIG. 2A.

Lip 112, which is also known as an edge of a bottom side, includes icon plate 114 which is a graphic/viewing surface having one or more icons. Icons, which are also known as markers or indicators, are used to indicate device status or performance when the associated diffused illumination areas are activated. For example, when diffused illumination area 212 is lit or activated, it indicates that network connection "xyz" is active.

Optical channel 134 is situated between lip 112 and wall 136 for guiding the light beam(s) to create diffused illumination area(s). Icon plate 114, in one example, is capable of facilitating one or more diffused illumination areas, wherein the diffused illumination areas are viewable opposite from icon plate 114. In one example, icons "xyz" on front icon plate 130 and icon plate 114 represent the same network connection, and diffused illumination areas 202 and 212 are generated by a single light source or LED.

Lip 112 is an extended edge, which is substantially perpendicular to front icon plate 130, and houses icon plate 114 to enhance the viewing angle of diffused illumination areas. Large viewing angle enhances performance monitoring capabilities by a user or an administrator. Marker or indicator as printed graphic function allows light generated by an LED to be seen from straight on (or zero degree viewing angle). It should be noted that performance of a function is indicated by illumination of an LED in close proximity to its respective functional icon or marker. Network device 200 or 210 uses light such as diffused illuminations to project directly or indirectly onto angled graphic surfaces 114 and 130 for performance monitoring by a user.

Present embodiment(s) of the device allows a user or network administrator to view status indicators over a wide angle with multiple orientations by using two indicator surfaces of indirect lighting. A first surface is a printed graphic surface and a second surface is an angled printed graphic surface. In one example, the first surface is in close proximity to a light source while the second surface is lit by the same light source. Note that an application of the present embodiment is applicable to desktop products used for network processing as well as standing products.

Figure 3A:
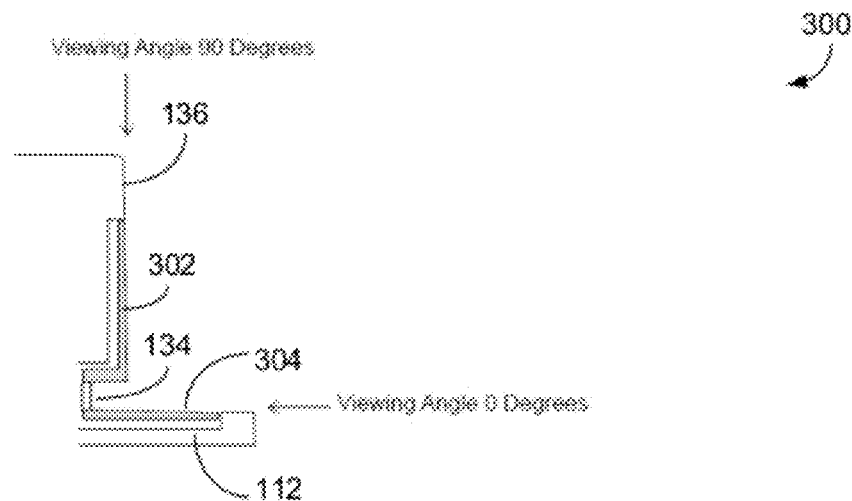
FIG. 3AB are cross-section diagrams illustrating diffused illumination areas in accordance with one embodiment of the present invention.
Figure 3B:
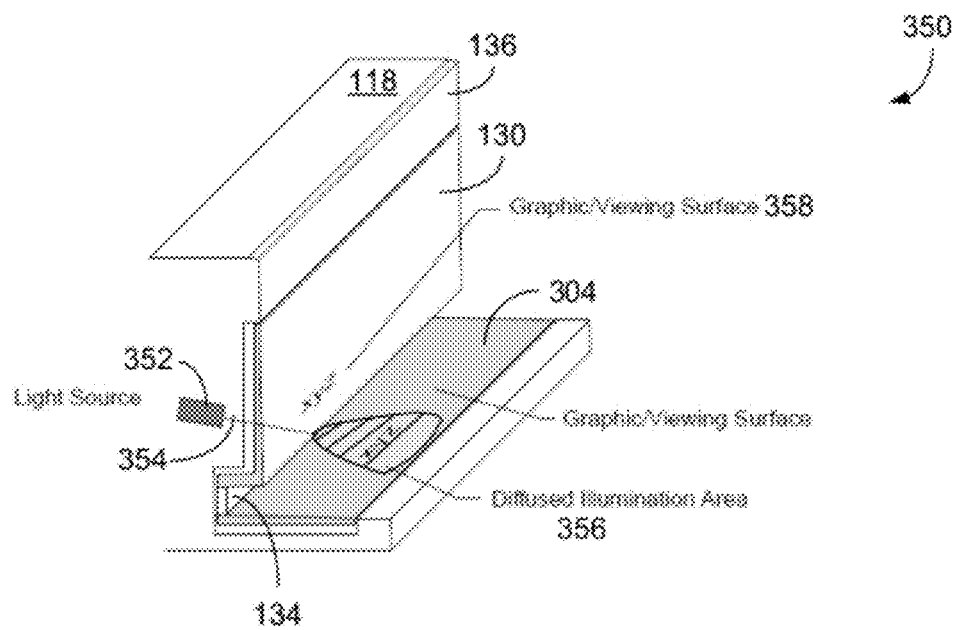

FIG. 3A is a cross-section diagram 300 showing sectional view of a network device illustrating a diffused illumination area in accordance with one embodiment of the present invention. FIG. 3B is a three-dimensional ("3D") diagram 350 showing sectional views of a network device shown in diagram 300 in accordance with one embodiment of the present invention. Diagram 300 shows wall 136, optical channel 134, and lip 112 wherein wall 136 further includes a graphic viewing surface 302 while lip 112 includes a second graphic viewing surface 304. Graphic viewing surfaces 302-304 are used to facilitate one or more diffused illumination areas. It should be noted that the underlying concept of the exemplary embodiment(s) of the present invention would not change if one or more elements were added to or removed from diagrams 300 or 310.

Diagram 350 further illustrates cover 118, light source 352 emitting a light beam 354, and diffused illumination area 356. Lighting source 352 may include LED, lens, and the like. To generate diffused illumination area 356, various optical elements and materials are used to initiate and control light beams with sufficient space between them. For example, graphic viewing surface 302 or 304 may be made by a specific optical material to collimate light beam(s) thereby a predefined diffused illumination area can be properly achieved.

In operation, diffused illuminations or lighting indicators are lit on a vertical surface or front icon plate by illuminating a functional icon with certain viewing angle. As a user or administrator moves toward or away from the device, the viewing angle becomes more acute. The present embodiment (s) of the invention provides a device having a wide viewing angle to enhance performance monitoring. It should be noted that a vertical graphical indicating surface and a second angled graphical indicating surface are lit by a single LED. The graphical indicating surfaces, however, do not need to be orthogonal, nor vertical and horizontal. A desirable angled surface can be formed based on specific applications.

For a desktop product or device, a user's viewing point, for example, is above the device. When the user moves closer to the device, for example, the user's vantage point is higher above the product and cuts down readability of front panel indicators as the viewing angle becomes more acute. The advantage of the embodiment(s) of present invention is to allow a greater than 90 degree continuous viewing angle. User or users can observe device status or performance from a horizontal orientation to a vertical orientation. It should be noted that the embodiment of the present invention allows the product or device to be placed horizontally or vertically on a desk.

Figure 4A:
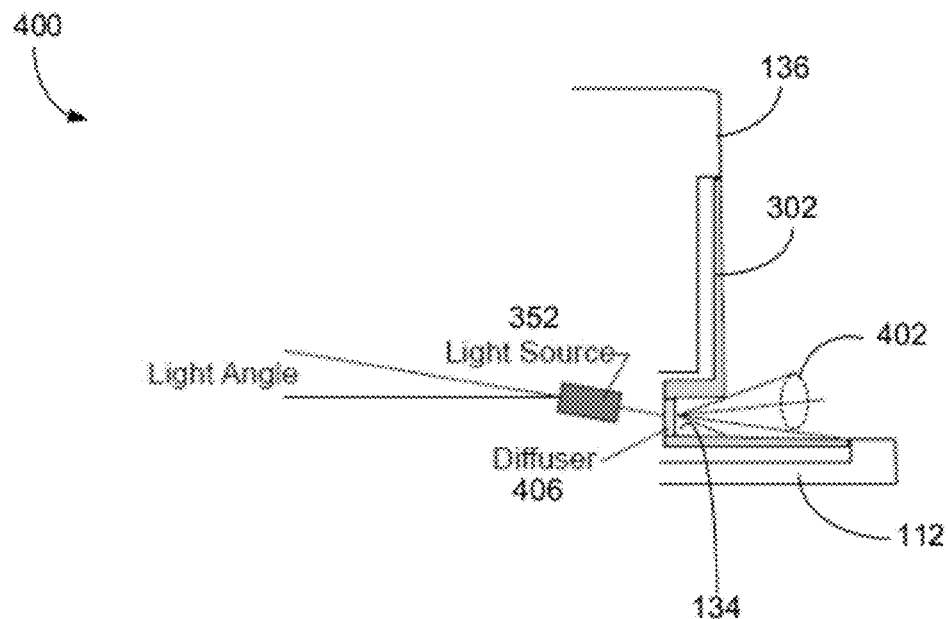
FIG. 4AB are cross-section diagrams illustrating light beams generated by a light source in accordance with one embodiment of the present invention.
Figure 4B:
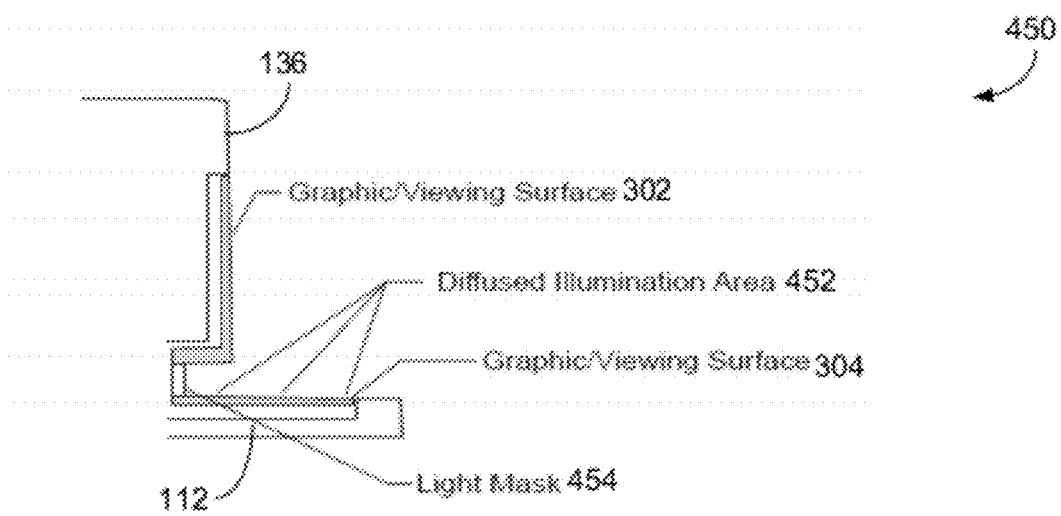

FIG. 4A is a cross-section diagram 400 illustrating light beams generated by a light source in accordance with one embodiment of the present invention. Diagram 400 shows wall 136, lip 112, and a light source 352 with a diffuser 406. Depending on the position of light source 352, a light beam with predefined collimation 402 can be formed when optical light passes through diffuser 406. The viewing angle of the lighting generated by light source 352 is also controlled or confined by optical channel 134. FIG. 4B illustrates graphic viewing surface 304 used to optically deflect diffused illumination 452 when the optical beam(s) passes through light mask 454 and strikes on the surface of graphic viewing surface 304. Depending on the applications, different optical materials may be used for graphic view surfaces for different applications. A diffusing surface is applied to the front of a light mask for providing greater light projection to horizontal graphic viewing areas.

Figure 5A:
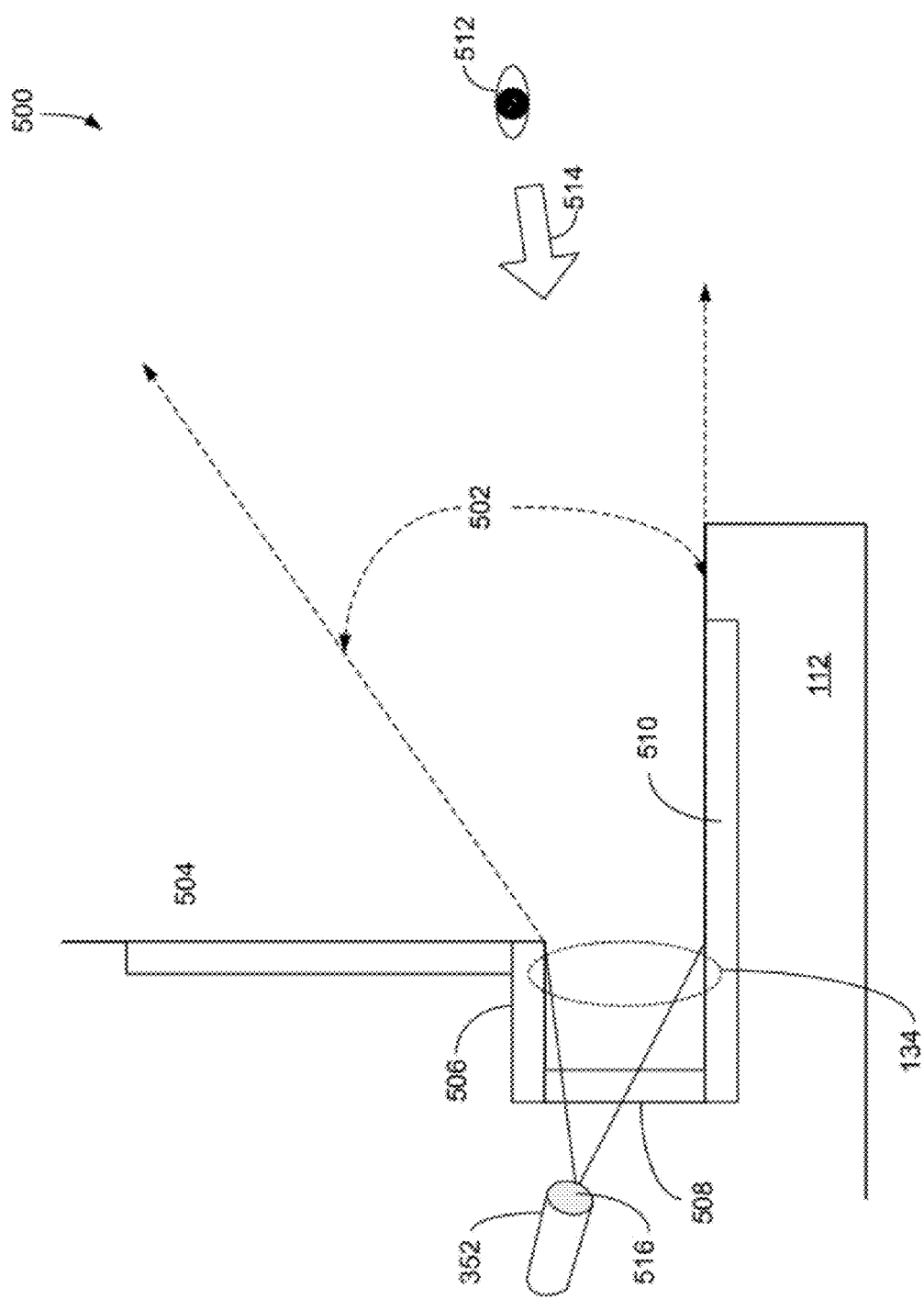
FIG. 5AB are cross-section diagrams showing sectional views of a device using wide angle viewing orientations in accordance with one embodiment of the present invention.

FIG. 5A is a cross-section diagram 500 showing sectional views of a device using wide angle viewing orientations in accordance with one embodiment of the present invention. Diagram 500 includes optical channel 134, light source 352, and a viewing angle 502. Depending on the applications, various different optical materials may be used to make graphic view surfaces 504, 510, light mask 508, and upper side 506. Note that upper side 506 and graphic viewing surface 510 form optical channel 134 which is at least partially responsible to collimate optical light viewable from a direction indicated by arrow 514. When a user 512 looks at direction 514, user 512 can see device performance and/or status by viewing the diffused illumination(s) associated with indicator(s) with viewing angle 502. The range of viewing angle 502 can change depending on the position of light source 352, lens 516, channel 134, as well as optical materials used.

Figure 5B:
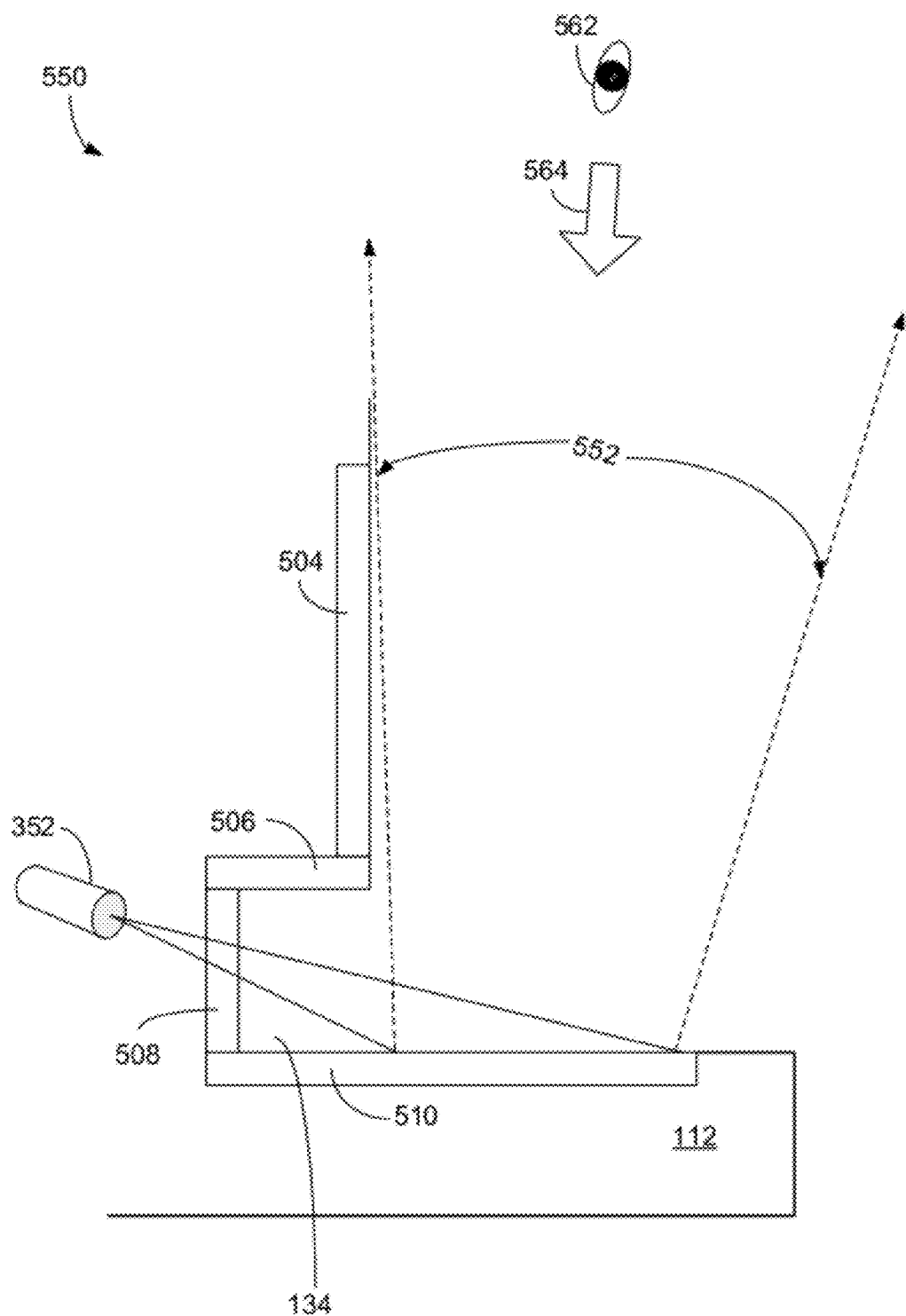

FIG. 5B is a cross-section diagram 550 showing sectional views of device layout having wide angle viewing orientations in accordance with one embodiment of the present invention. Diagram 550 includes optical channel 134, light source 352, and a viewing angle 552. The position of light source 352 and materials used for graphic viewing surface 510 determines the range of viewable angle 552. When a user 562 looks at direction 564, user 562 can view device performance by observing diffused illuminations associated with indicator(s) with viewing angle 552. The range of viewing angle 552 can change depending on the position of light source 352, lens 516, channel 134, as well as optical materials used in the device.

When viewing angles 502 and 552 overlap, a user has a 90-degree viewable angle to monitor device status. It should be noted that the viewable angle can be greater than 90 degree angle. In one embodiment, the combination of angles 502 and 552 is a wide viewing angle.

In one example, a system for network communication has a first graphic viewing surface, a second graphic viewing surface, and an LED. The first graphic viewing surface has first printed icons describing functional indicators and the second graphic viewing surface has second printed icons describing functional indicators. The first and second graphic viewing surfaces are situated at a predefined angle. The LED provides a first diffused illumination area and a second diffused illumination area. The first diffused illumination area illuminates a portion of the first graphic viewing surface to indicate a first device performance and the second diffused illumination area illuminates a portion of the second graphic viewing surface to indicate a second device performance. The first device performance and the second device performance can indicate substantially the same device performance. The system may further include an optical guiding channel capable of guiding optical beams to create the first and the second diffused illumination areas. The optical guiding channel, in one aspect, creates a groove between the first graphic viewing surface and the second graphic viewing surface. The predefined angle may include a range from 20 degrees to 170 degrees.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
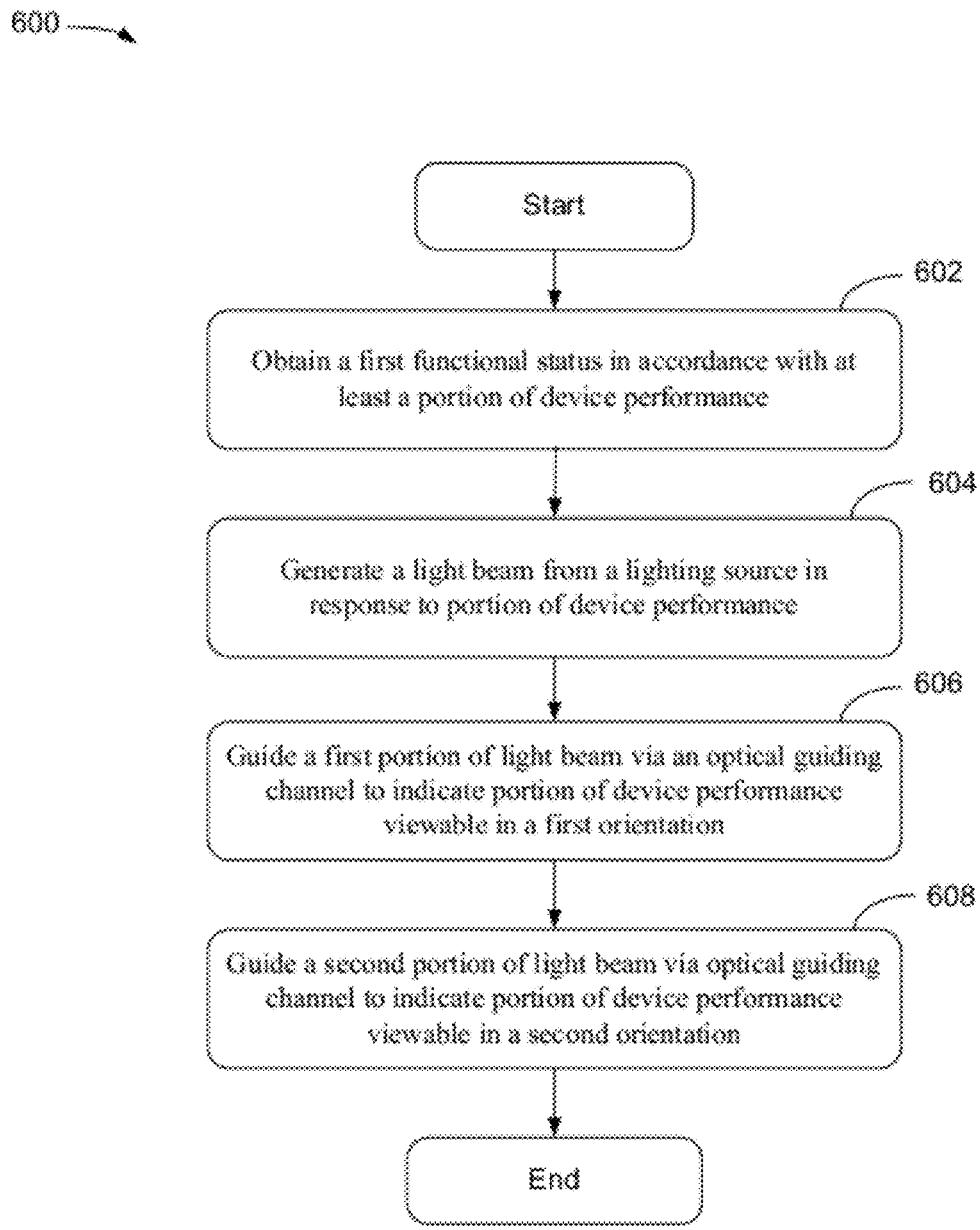
FIG. 6 is a flowchart illustrating a process of providing a wide angle viewing orientation in accordance with one embodiment of the present invention.
Figure 7:
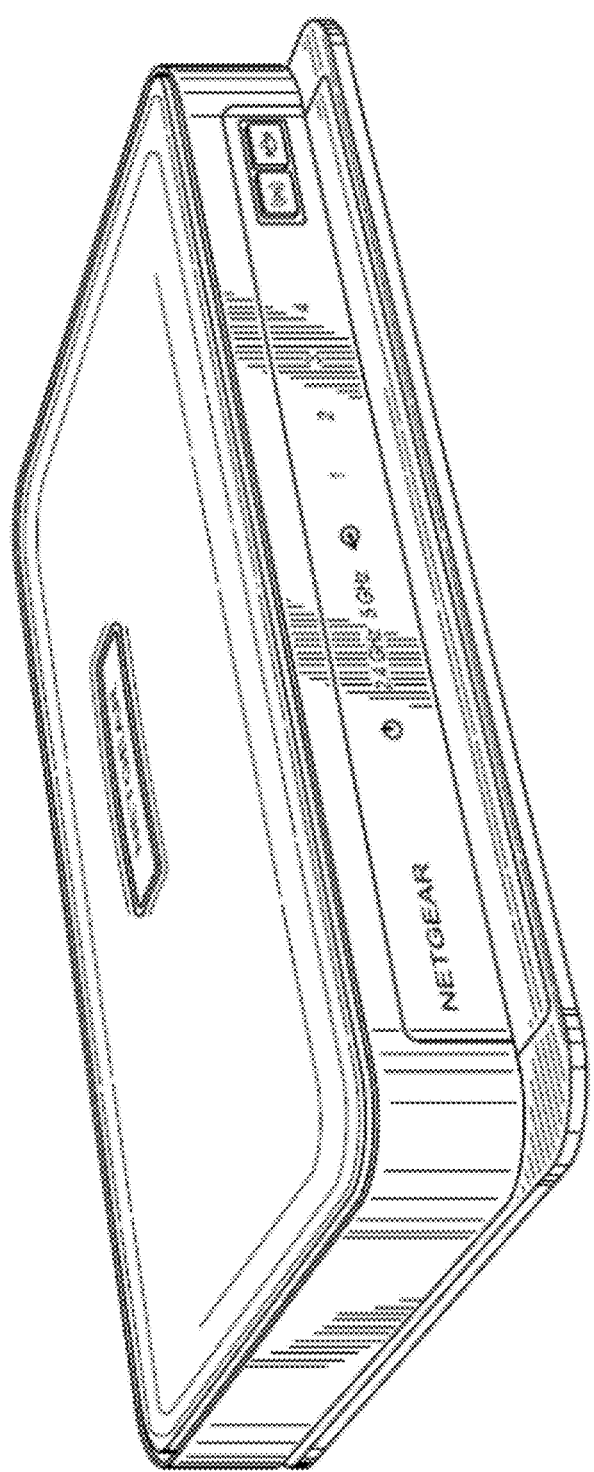
FIG. 7 illustrates a perspective view of a device layout capable of providing wide angle viewing orientation in accordance with one embodiment of the present invention.
Figure 8:
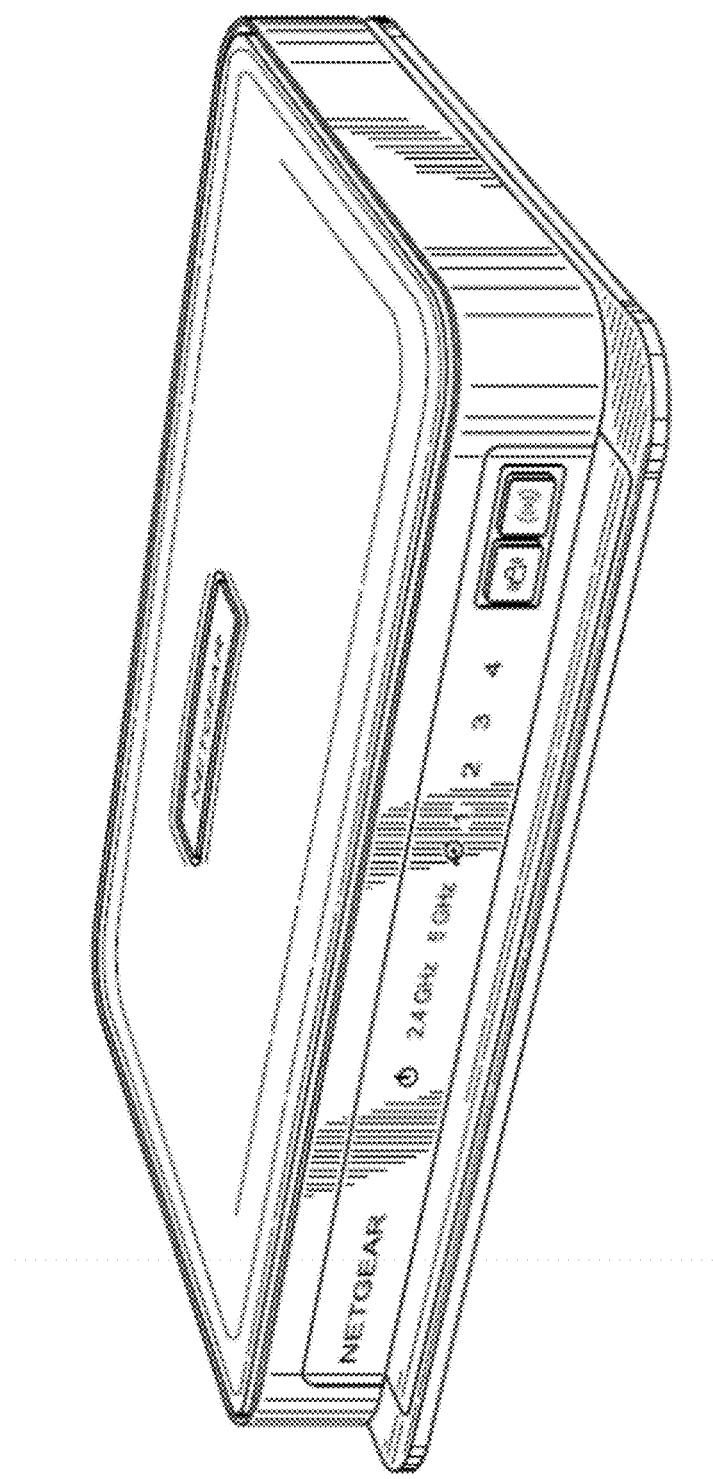
FIG. 8 illustrates another perspective view of a device layout capable of providing wide angle viewing orientation in accordance with one embodiment of the present invention.
Figure 9:
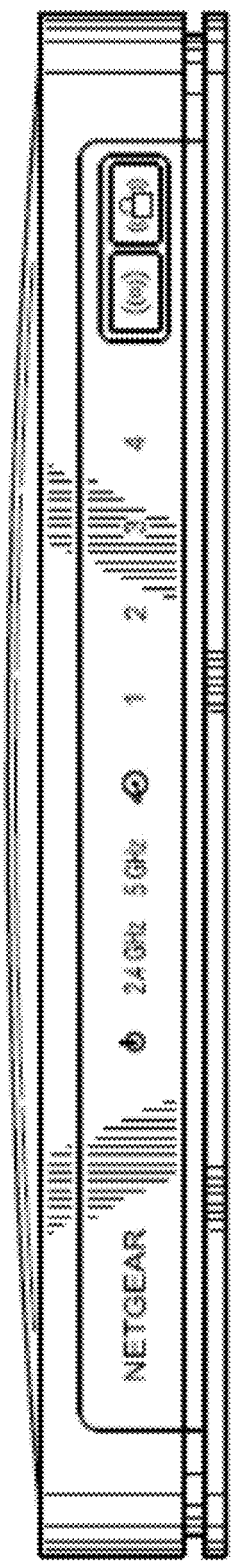
FIG. 9 illustrates a front view of a device layout capable of providing wide angle viewing orientation in accordance with one embodiment of the present invention.
Figure 10:
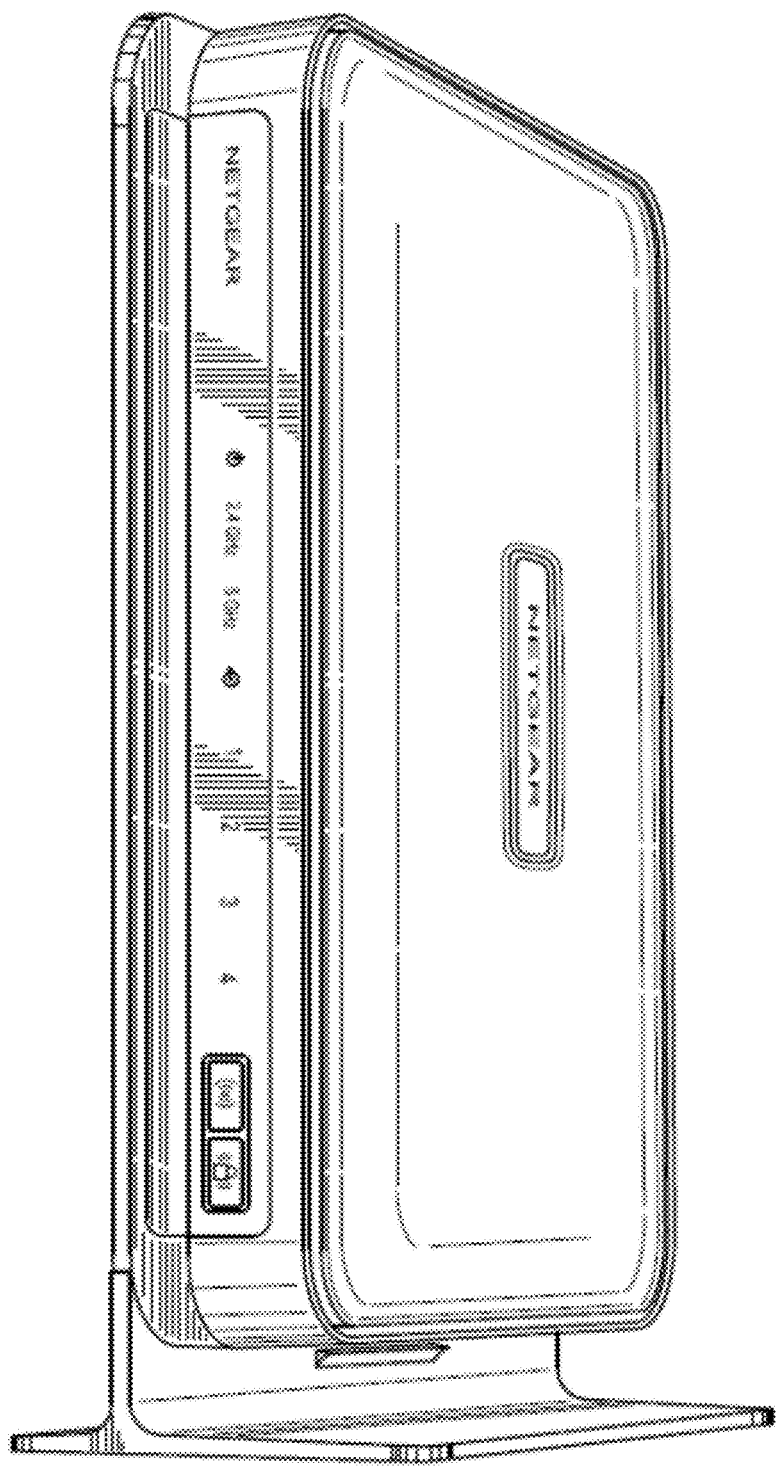
FIG. 10 illustrates a standing view of a device layout capable of providing wide angle viewing orientation in accordance with one embodiment of the present invention.

FIG. 6 is a flowchart 600 illustrating a process of providing a wide angle viewing orientation in accordance with one embodiment of the present invention. At block 602, a network process obtains a first functional status in accordance with at least a portion of device performance. For example, the process is capable of identifying a signal indicating bandwidth of communication.

At block 604, the process generates a light beam from a light source in response to the portion of device performance. For example, a section of a graphic viewing surface in accordance with the portion of device performance is subsequently illuminated.

At block 606, the process is capable of guiding a first portion of the light beam via an optical guiding channel to indicate the portion of device performance viewable in a first orientation. The process directs or forwards sufficient portion of light beam to form a first diffused illumination area in a first direction.

At block 608, the process guides a second portion of the light beam via the optical guiding channel to indicate the portion of device performance viewable in a second orientation. The process is capable of directing sufficient portion of light beam to form a second diffused illumination area in a second direction.

FIGS. 7-10 illustrate a set of 3D device layouts capable of enhancing the capability of status monitoring using wide angle viewing orientations in accordance with one embodiment of the present invention.

Overview for Network Device Having Optical Transparent or Semitransparent Plate

FIGS. 11-17 illustrate an alternative embodiment of a network device capable of displaying system status using an optical transparent or semitransparent ("OTST") plate which allows the system status to be viewable in a wide angle.

A network device capable of providing data transmission includes a first plate, an OTST (or second) plate, and a light source. The first plate is situated at a first side of the network device wherein the first side can be the front side of device. The OTST plate is situated at a second side of the network device and positioned substantially perpendicular to the first plate, wherein the OTST plate having a first surface and a second surface further includes status indicators showing performance status associated with the network device. The light source, in one embodiment, can be an LED device capable of projecting a column of light beam with a predefined angle onto the first surface of OTST plate illuminating one or more status indicators. At least one status indicator is viewable from the second surface or bottom surface of OTST second plate when at least a portion of OTST plate is illuminated.

Alternatively, a network device or system includes a first plate, a second plate, and a first light source. The first plate includes an edge lip or lip containing a graphic viewing surface. Various ultraviolet ("UV") inked icons indicating functional performance are inscribed in or on the graphic viewing surface. The second plate is situated substantially perpendicular to the first plate, wherein an edge of the second plate is positioned adjacent to the graphic viewing surface. The first light source is configured to selectively project a UV light onto at least a portion of the graphic viewing surface to active at least one UV inked icon.

Figure 11A:
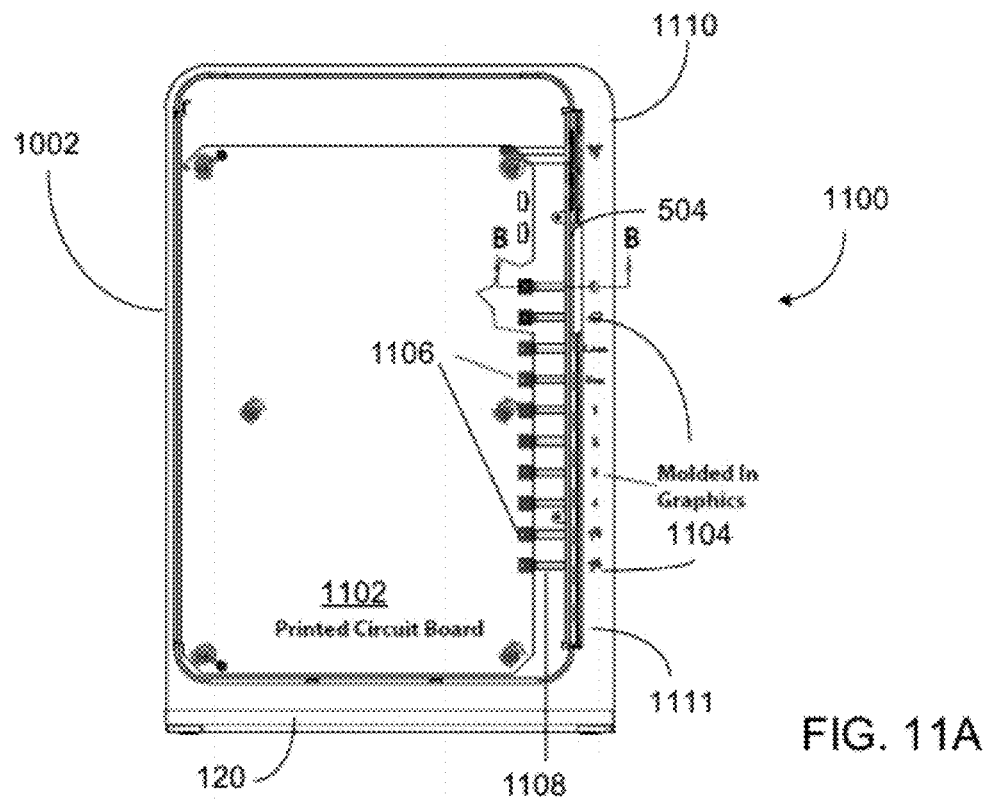
FIG. 11A is a top view cutaway diagram illustrating a network device 1002 capable of displaying system status viewable in a wide viewing angle in accordance with one embodiment of the present invention.

FIG. 11A is a top view partially cutaway diagram 1100 illustrating a network device 1002 capable of displaying system status viewable in a wide viewing angle in accordance with one embodiment of the present invention. Diagram 1100 includes a base plate 1110, a vertical viewing surface 504, a printed circuit board ("PCB") 1102, light sources 1106, and light guides 1108. In one embodiment, light sources 1106 are LEDs, solid state semiconductor light emitting devices, and/or any other types of light emitting apparatus. It should be noted that the underlying concept of the exemplary embodiment(s) of the present invention would not change if one or more elements were added to or removed from diagrams 1100.

Base plate 1110, in one embodiment, is a light transmissible plane configured to attach to one side of network device 1002. To anchor network device 1002, base plate 1110 is fastened to the bottom surface of network device 1002. Base plate 1110 includes a stand 120 allowing network device 1002 to stand in vertical orientation. Note that stand 120 may be detachable from base plate 1110. In one embodiment, base plate 1110 has an edge lip or lip 1111 which is a protruding portion of base plate 1110 adjacent to network device 1002. Edge lip 1111 provides system status associated with network device 1002.

Edge lip 1111 of base plate 1110 includes a group of performance status indicators or graphic icons 1104 used to indicate system or performance status. Performance status indicators 1104 includes, but not limited to, "WPS (Wi-Fi Protected Setup)," "WiFi on/off," "Power on/off," "Internet connection," "2.4 GHz," "LAN 1," "LAN 2," "USB 1," et cetera. Various symbols representing performance status indicators 1104, for example, may be used to indicate system status associated with network device 1002. The terms "performance status indicators," "status graphic icons," "inscribed status indicator," "status indicators," "system status," and "UV inked icons" have the same or substantially the same meaning, and are used herein interchangeably in the follow description.

Base plate 1110, in one aspect, is fabricated with optical transparent and/or semitransparent (OTST) material capable of transmitting optical light. For example, base plate 1110 may be fabricated by glass, plastic, polymer, resin, fiberglass, epoxy, or a combination of glass, plastic, polymer, resin, fiberglass, epoxy. Status indicators 1104, in one embodiment, can be molded, inscribed, and/or printed on a surface of edge lip 1111. The surface can be either the top surface or bottom surface of edge lip 1111. Alternatively, status indicators 1104 can be inscribed or embedded inside of edge lip 1111. The inscribed words and/or symbols representing status indicators 1104 are configured to be viewable from a distance with a wide range of angle when the inscribed symbol(s) or word(s) are illuminated. Note that OTST base plate 1110 is designed to transmit light from light source 1106 to edge lip 1111 with minimal optical degradation.

For an UV light application, base plate 1110, in one aspect, includes multiple sub-layers wherein each sub-layer containing various status indicators is configured to respond to a specific UV light or a particular range of UV wavelengths. For instance, when an UV light with a first specific wavelength illuminates a first set of status indicators printed by first kind of UV ink, and a second UV light with a second specific wavelength illuminates another set of status indicators printed by second kind of UV ink. Note that specific UV ink is designed to be illuminated when the UV ink is shone by a specific corresponding UV light. As such, depending on the status of network system, a particular UV light may be selectively generated to illuminate a particular set of status indicators in a sub-layer of base plate 1110. Note that one or more molded-in or inscribed status indicators 1104 on the base plate 1110, in one instance, become visible when they are illuminated by a light generated by one or more light sources 1106.

PCB 1102 is used to house various components and/or integrated circuits ("ICs") including multiple light sources 1106 and light guides 1108. Light sources 1106 include an array of lighting elements which, for example, can be LEDs. Each lighting element of light sources 1106, in one aspect, may be designated to a corresponding status indicator on edge lip 1111. Note that every status indicator indicates a particular status associated with network device 1002. PCB 1102 may include other networking components such as transmitter(s), receiver(s), power management, memory, wireless and LAN transceivers, routing controller(s), packet processor(s), and the like.

Light guides 1108 are used to provide light passages, conduits, channels, and/or paths allowing light beams to travel from light sources 1106 to edge lip 1111 via one or more medium with minimal optical degradation. Each light guide, in one embodiment, is designated or corresponded to one light source and one status indicator. Alternatively, a light guide is responsible for guiding multiple light beams generated by several LEDs such as UV light sources to illuminate one or more status indicators. In one example, one end of light guide couples to a light source while another end of light guide couples to light diffuser 508 (shown in FIG. 11B). While optically coupled to a light source, a light guide conveys light beam(s) emitted from light source 1106 to light diffuser 508.

Figure 11B:
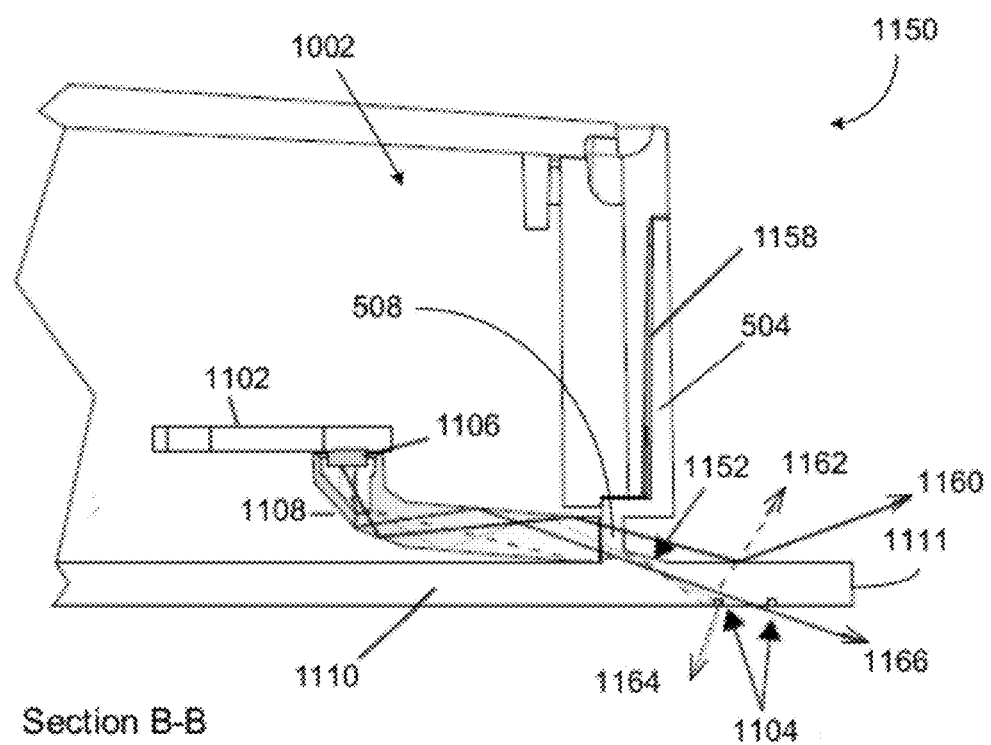
FIG. 11B is a cross-section diagram 1150 illustrating network device capable of displaying system status in accordance with one embodiment of the present invention.

At light diffuser 508, a portion of light beam 1160, for example, exits from light diffuser 508 with an angle and subsequently travels through air before it hits the top surface of base plate 1110. Another portion of light beam 1166 travels from a light source to light diffuser 508 and then from light diffuser 508 (as shown in FIG. 11B) to the bottom surface of base plate 1110 via a prism 1152. To minimize optical loss or degradation, the size and/or configuration of each light guide can be adjusted to provide proper internal optical reflections to maximize optical transmission with minimal optical loss.

In one operation, upon detecting a performance condition associated with network device 1002, a light source corresponding to the performance condition is selected to emit a light beam traveling through a corresponding light guide 1108 to illuminate a corresponding status indicator 1104 on edge lip 1111. For example, when network device 1002 is transmitting data at a rate of 2.4 GHz (Gigahertz), a corresponding status indicator labeling "2.4 GHz" may be illuminated. Illumination of a status indicator can be achieved by projecting or shining a light beam onto an inscribed symbol or word(s). For an UV application, an UV light beam is selected to illuminate an UV inked icon representing the status indicator such as 2.4 GHz.

FIG. 11B is a cross-section diagram 1150 illustrating network device 1002 capable of displaying system status in accordance with one embodiment of the present invention. Diagram 1150 illustrates a side-view section B-B shown in diagram 1100 as indicated in FIG. 11A. Diagram 1150 includes a vertical viewing surface 504, an overlay graphics 1158, PCB 1102, a light source 1106, a light guide 1108, an optical prism 1152, a base plate 1110, a light diffuser 508, and a status indicator 1104. Light guide 1108 is also known as light pipe. Status indicator 1104 may be referred to as a molded symbol, inscribed words, and/or UV inked icon.

Overlaying graphics 1158, in one example, is a plane having various status symbols, indicators, or icons showing real-time status of network device 1002. The status symbols indicate similar information as status indicators on edge lip 1111. Each symbol or icon represents a corresponding performance status of network device 1002. Vertical viewing surface 504, which for example can be a clear plane, is placed outside of overlaying graphics 1158 as front plate of network device 1002. In one aspect, status symbols printed on overlaying graphics 1158 become visible when they are illuminated by one or more light sources. Since the information or status displayed on overlaying graphics 1158 is similar to status indicators 1104 printed or inked on base plate 1110, both overlaying graphics 1158 and status indicator 1104, for example, may be illuminated and/or displayed simultaneously to increase viewing angle.

Light guide 1108, which can also be referred to as light pipe, is a light transmission conduit capable of transmitting optical light with minimal optical degradation. Light guide 1108 may be made of any optical transparent material with good or high optical transmittance with efficient optical reflections such as optical fiber(s). Light diffuser 508, in one example, is an optical transparent window allowing passage of light. One side of light diffuser 508 is coupled to base plate 1110 while another side of light diffuser 508 is coupled to vertical viewing surface 504. A function of light diffuser 508 is to facilitate light passage between light from light guide 1108 to base plate 1110.

An optical prism or prism 1152, in one embodiment, having a side-view of triangular structure is coupled with light diffuser 508 and base plate 1110. One side of prism 1152 touches light diffuser 508 and another side of prism 1152 contacts base plate 1110. A function of prism 1152 is to transmit a light beam from light diffuser 508 to base plate 1110 or edge lip 1111. Prism 1152, in one embodiment, is fabricated by optical transparent material similar to light diffuser 508 and/or base plate 1110. In one embodiment, prism 1152, light diffuser 508, and base plate 1110 are fabricated as one piece structure. For example, one piece structure containing base plate 1110, diffuser 508, and prism 1152 are manufactured via a mold-casted process.

Depending on the applications, light guide 1108 can be configured to guide the light beam(s) to a specific area of edge lip 1111. For example, if status indicators 1104 are located at the bottom surface of edge lip 1111, light guide 1108 is configured to guide a light beam such as light beam 1166 to pass through light diffuser 508 and prism 1152 before it reaches to the bottom surface of edge lip 1111. Note that when light beam 1166 passes through the bottom surface of edge lip 1111, status indicators 1104 are illuminated. Alternatively, if the status indicators are located on the top surface of edge lip 1111, light guide 1108 is adjusted to guide a light beam 1160 to pass through diffuser 508 and medium of air before light beam 1160 hits the top surface of edge lip 1111. When light beam 1160 arrives at the top surface of edge lip 1111, status indicators located on the top surface of edge lip 1111 are illuminated.

Figure 11C:
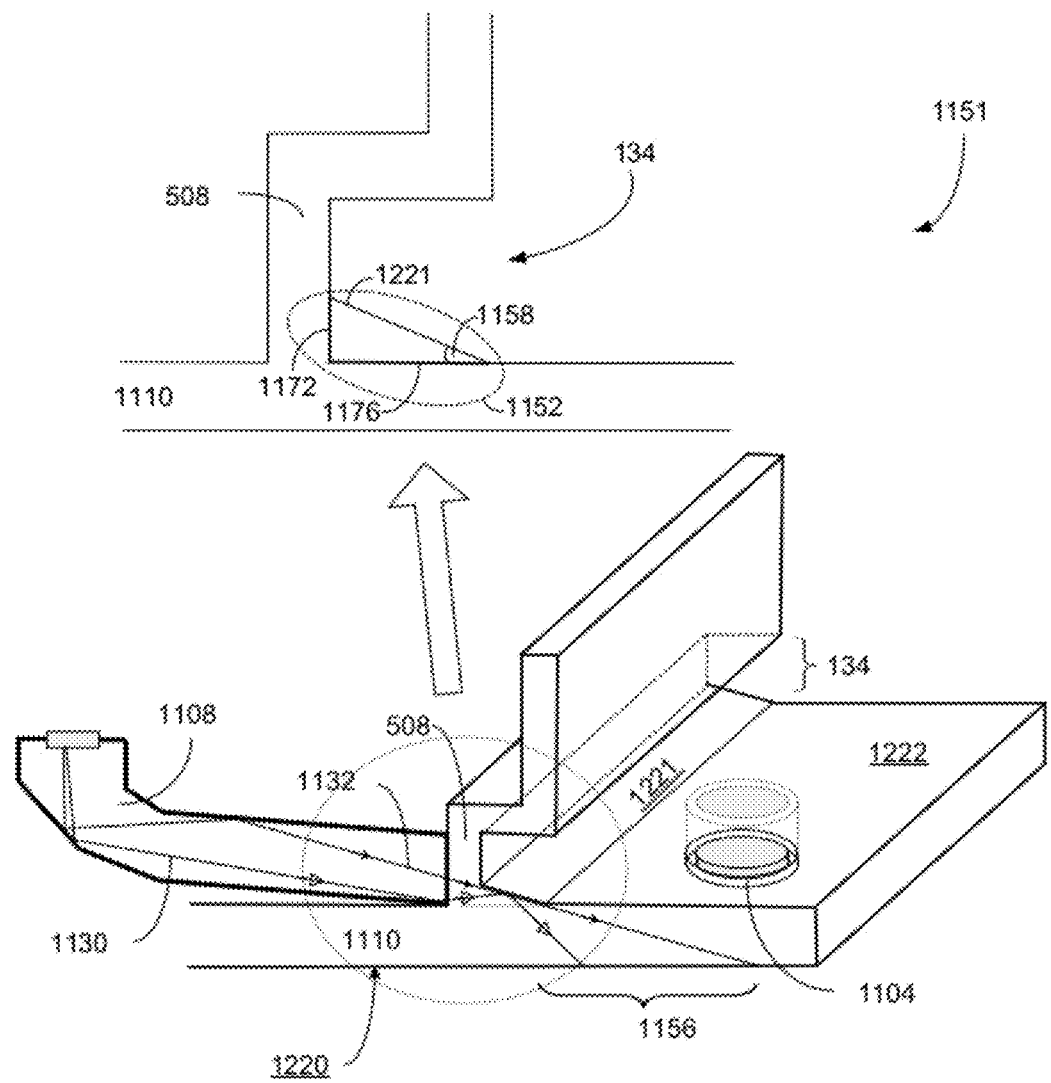
FIG. 11C is a cross-section diagram illustrating a prism or optical prism capable of transmitting light in accordance with one embodiment of the present invention.

FIG. 11C is a cross-section diagram 1151 illustrating a prism or optical prism 1152 capable of transmitting light in accordance with one embodiment of the present invention. Optical prism 1152, in one embodiment, is a triangular shaped structure located along optical channel 134 between light diffuser 508 and base plate 1110. Prism or optical prism 1152 includes a first plane 1172, a second plane 1176, and a slanted flat plane (or surface) 1221. First plane 1172 of prism 1152 is coupled to light diffuser 508 and second plane 1176 of prism 1152 is coupled to top surface 1222 of base plate 1110. Slanted flat surface 1221 intersects with second plane 1176 with an angle 1158. The degree of angle 1158 may vary depending on the applications. In one embodiment, prism 1152 is fabricated together with light diffuser 508 and/or base plate 1110.

Optical prism 1152, in one embodiment, is configured in such a way that it is able to project light beam(s) onto a specific predefined area. For example, light beam 1132 is able to project light directly to area 1156 located at the bottom surface of base plate 1110. When light beam 1130 impacts slanted surface 1221 after it leaves from light diffuser 508, at least a portion of the light is deflected from slated surface 1221 to area 1156. A function of optical prism 1152 is to provide light guidance to base plate 1110 with minimal light degradation. It should be noted that other shapes of prism can be structured to provide similar light guidance functions.

Figure 12A:
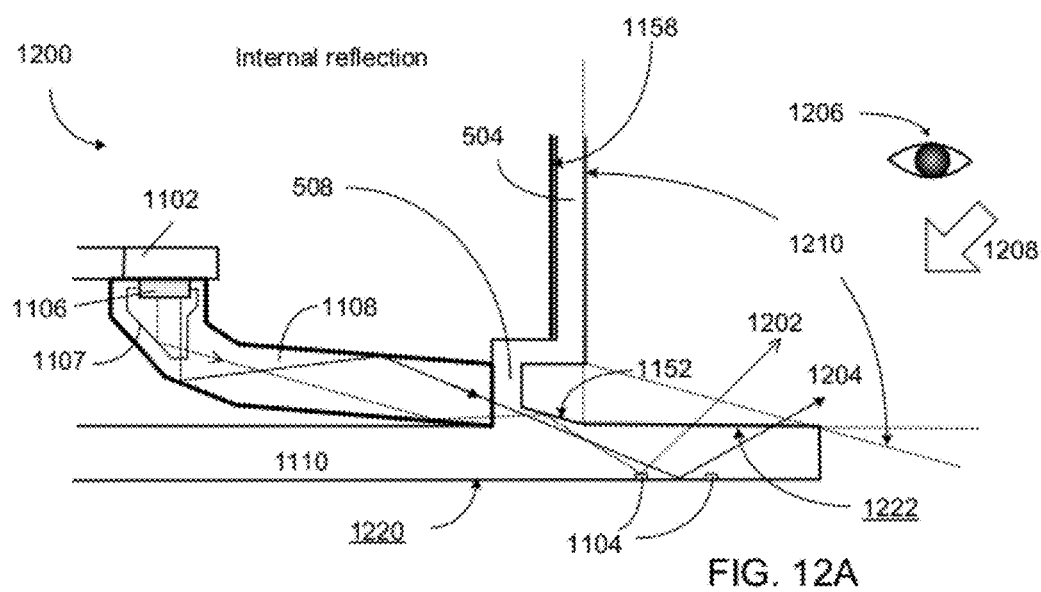
FIG. 12A is a cross-section diagram illustrating a light pattern capable of illuminating inscribed indicators on a surface of base plate in accordance with the present invention.

FIG. 12A is a cross-section diagram 1200 illustrating a light pattern capable of illuminating inscribed indicators 1104 on a surface of base plate 1110 in accordance with the present invention. Diagram 1200 includes an LED 1106, a PCB 1102, a light conduit 1108, a base plate 1110, a prism 1152, a light diffuser 508, and an overlaying performance status indicators 1158. Base plate 1110 includes a top surface 1222 and a bottom surface 1220, wherein various status indicators can be inscribed either on top surface 1222 or bottom surface 1220. It should be noted that the underlying concept of the exemplary embodiment(s) of the present invention would not change if one or more elements were added to or removed from diagrams 1200.

When LED 1106 is selected to generate light, LED 1106 emits light such as light beams 1202-1204. Depending on the position of LED 1106 and/or shape of lens 1107, different light beams may travel on different paths. For example, light beam 1202 travels to prism 1152 via conduit 1108 and subsequently, is deflected onto inscribed indicator 1104 via a surface of prism 1152. Light beam 1204 arrives at back surface 1220 after it is reflected from conduit 1108. Depending on the angle of incidence at bottom surface of base plate 1110, a portion of light beam 1202 is reflected by bottom surface 1220 toward top surface 1222 and another portion may exit through bottom surface 1220.

The reflected light passing through top surface 1222 of base plate 1110 creates an illumination region containing illuminated status indicators 1104 which may be viewable from top surface 1222. For instance, a user 1206 can observe device status from illuminated status indicators 1104 as indicated by arrow 1208. Note that status indicators printed on top surface 1222 or middle of base plate 1110 can be similarly displayed as the indicators at bottom surface 1220. To widen viewable range, the same or substantially the same system status is displayed via overlaying performance status indicators 1158 which is located at a plane perpendicular to base plate 1110. When overlaying performance status indicators 1158 and inscribed status indicators 1104 are illuminated in concert, a large viewing angle 1210 for user 1206 can be achieved.

Figure 12B:
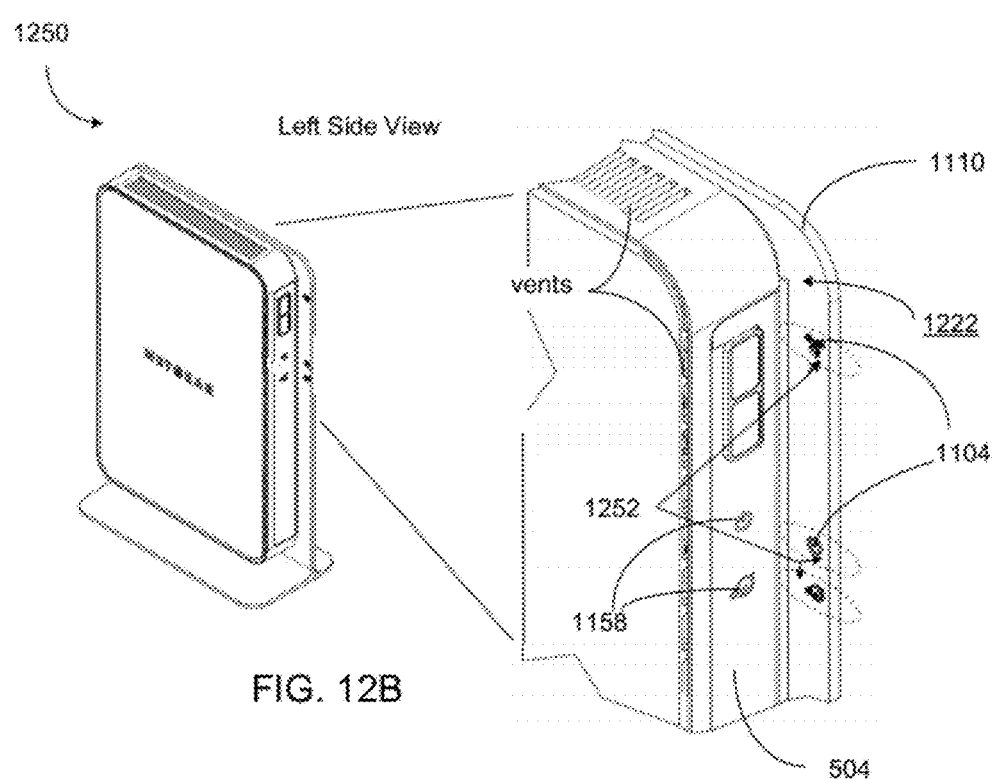
FIG. 12B is an exemplary three-dimensional ("3D") diagram showing illuminated status indicators and overlaying performance status indicator in accordance with one embodiment of the invention.

FIG. 12B is an exemplary three-dimensional ("3D") diagram 1250 showing illuminated status indicators 1104 and overlaying performance status indicator 1158 in accordance with one embodiment of the invention. Diagram 1250 includes base plate 1110, status indicators 1104, overlaying performance status indicator 1158, and heat dissipating vents wherein indicators 1104 and 1158 are illuminated in a coordinated manner. For example, overlaying performance status indicators 1158 can be displayed simultaneously with status indicator 1104 through vertical viewing surface 504. It should be noted that base plate 1110 is fabricated with OTST materials.

Figure 13A:
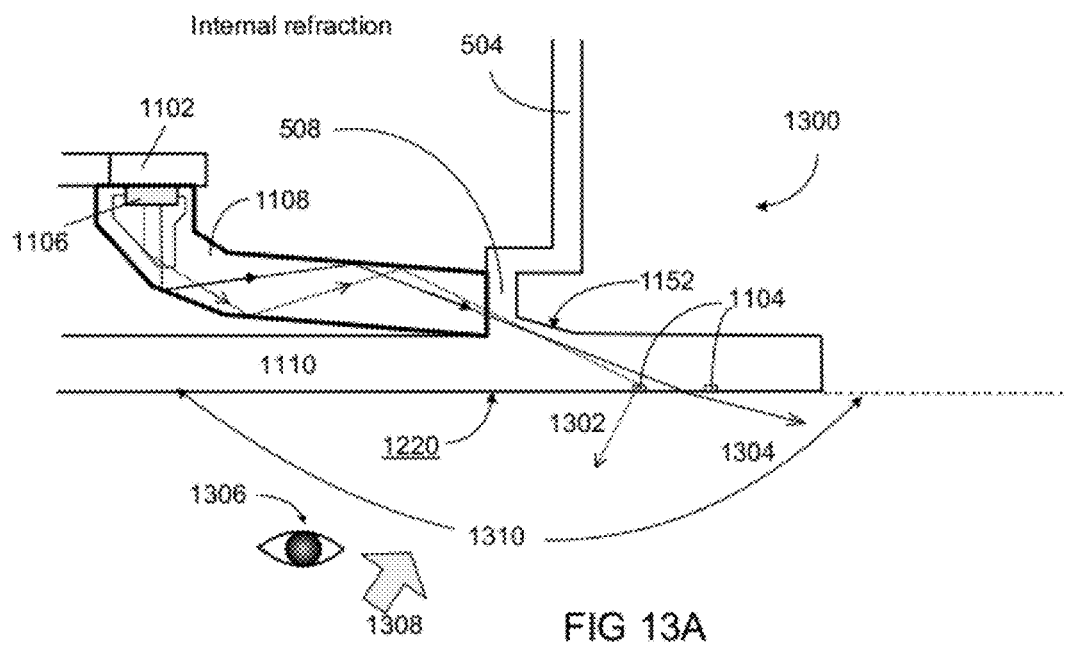
FIG. 13A is a cross-section diagram showing an example of displaying system status via inscribed indicators viewable from the bottom surface of base plate in accordance with one embodiment of the present invention.

FIG. 13A is a cross-section diagram 1300 showing an example of displaying system status via inscribed indicators 1104 viewable from the bottom surface of base plate 1110 in accordance with one embodiment of the present invention. Diagram 1300, which is similar to diagram 1200 shown in FIG. 12A, includes LED 1106, PCB 1102, light conduit 1108, base plate 1110, prism 1152, light diffuser 508, and vertical viewing surface 504. Light beams 1302-1304, in one embodiment, are calibrated to project a column of illuminating light onto bottom surface 1220 of base plate 1110 to display status indicators 1104. Note that the light beam calibration includes, but not limited to, shape of lens, position of LED 1106, angles of incidence, critical angles, and the like.

Base plate 1110, in one embodiment, is made by OTST materials whereby base plate 1110 allows the light to pass with minimal light degradation. When status indicators 1104 are illuminated, the system status can be viewable almost 180 degrees as indicated by numeral 1310 from bottom surface 1220. As such, user 1306 can monitor network performance by observing illuminated status indicators 1104 from a direction indicated by arrow 1308.

Figure 13B:
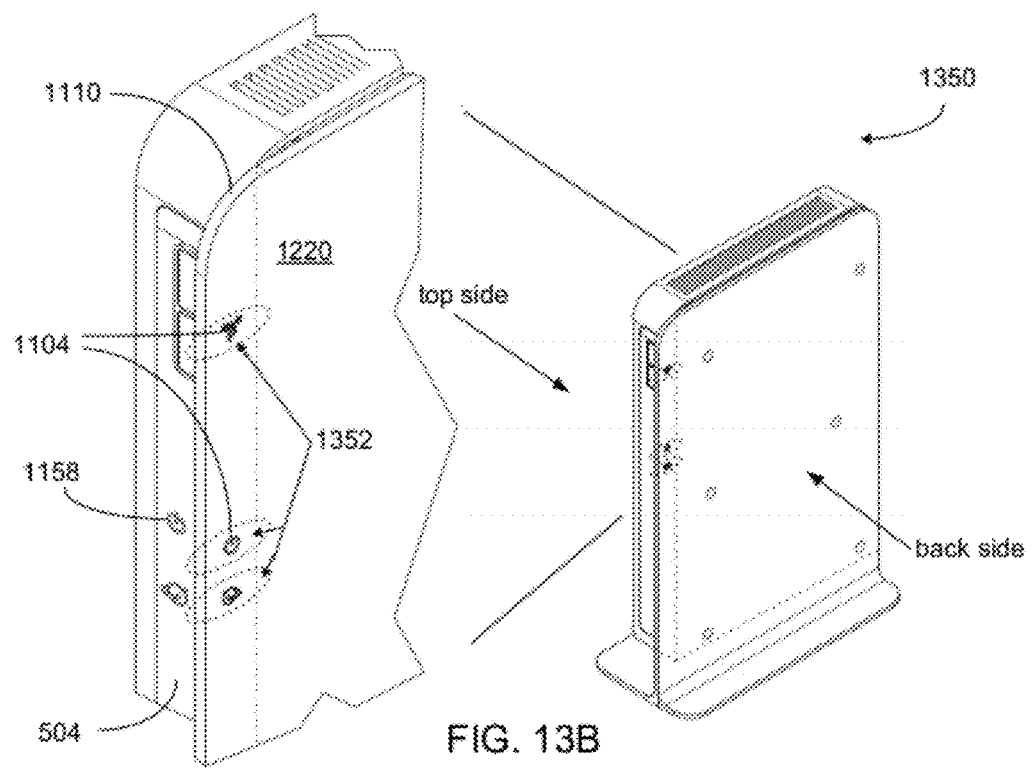
FIG. 13B is a 3D diagram illustrating status indicators viewable from bottom surface or backside of device in accordance with one embodiment of the present invention.

FIG. 13B is a 3D diagram 1350 illustrating status indicators viewable from bottom surface 1220 or backside of device in accordance with one embodiment of the present invention. One surface of network device is coupled to base plate 1110 which is made of OTST material. In one embodiment, the bottom surface of network device attaches to base plate 1110 which includes inscribed status indicators 1104 viewable from the backside of the network device. When light projecting regions 1352 which contains status indicators 1104 are illuminated, device status can be observed by an operator or user from the backside of the network device.

Diagram 1350 shows light projecting regions or diffused illumination regions 1352 displaying system status viewable from bottom surface 1220. It should be noted that the light conduits in the network device are structured in such a way that they guide various light beams to their destination in response to optical and/or physical properties, such as radiance reflection, optical projection, and/or optical deflection relating to light transmission. When status indicators 1104 are illuminated by light beams via calibrated internal reflection and/or refraction, system status is viewable from the top side as well as back side of the network device.

Figure 14:
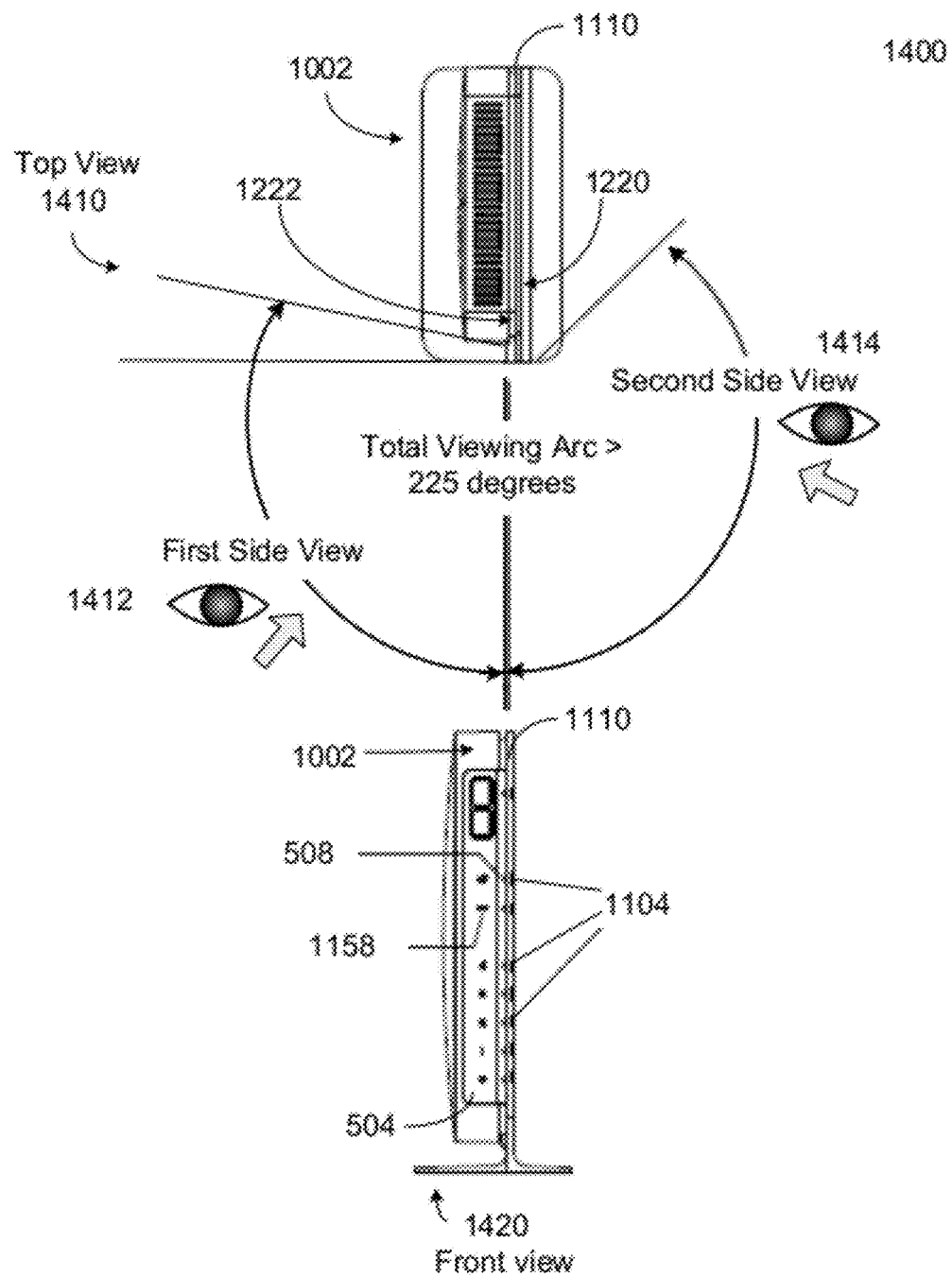
FIG. 14 is a diagram illustrating a system status viewable range displayed by network device in accordance with one embodiment of the present invention.

FIG. 14 is a diagram 1400 illustrating a system status viewable range displayed by network device 1002 in accordance with one embodiment of the present invention. Diagram 1400 includes a top view 1410 of network device 1002 in standing position, and a front view 1420 of network device 1002 in standing position. Top view 1410 illustrates a status viewable range of network device 1002 having a peripheral range of approximately 225 degrees. For example, a user can observe or monitor the performance status of network device 1002 from a first position 1412 which is between top surface 1222 and front view of device 1002, or from a second position 1414 which is between bottom surface 1220 and front view of device 1002.

Front view 1420 shows a status playing panel capable of displaying a group of overlaying performance status indicators 1158 through a transparent vertical viewing surface 504. When the angle between a user's line of sight and base plate 1110 becomes acute, status indicators 1104 inscribed in base late 1110 could become unreadable. For example, if a user stands in front of vertical viewing surface 504, status displayed by status indicators 1104 on base plate 1110 may not be distinguishable. To enhance viewable range of status reading, overlaying status indicators 1158 can be used to increase angle of status readability. As such, a wide angle of status monitoring range covering a peripheral region of more than 225 degrees can be achieved by employing both base plate 1110 and overlaying status indicators 1158.

Figure 15A:
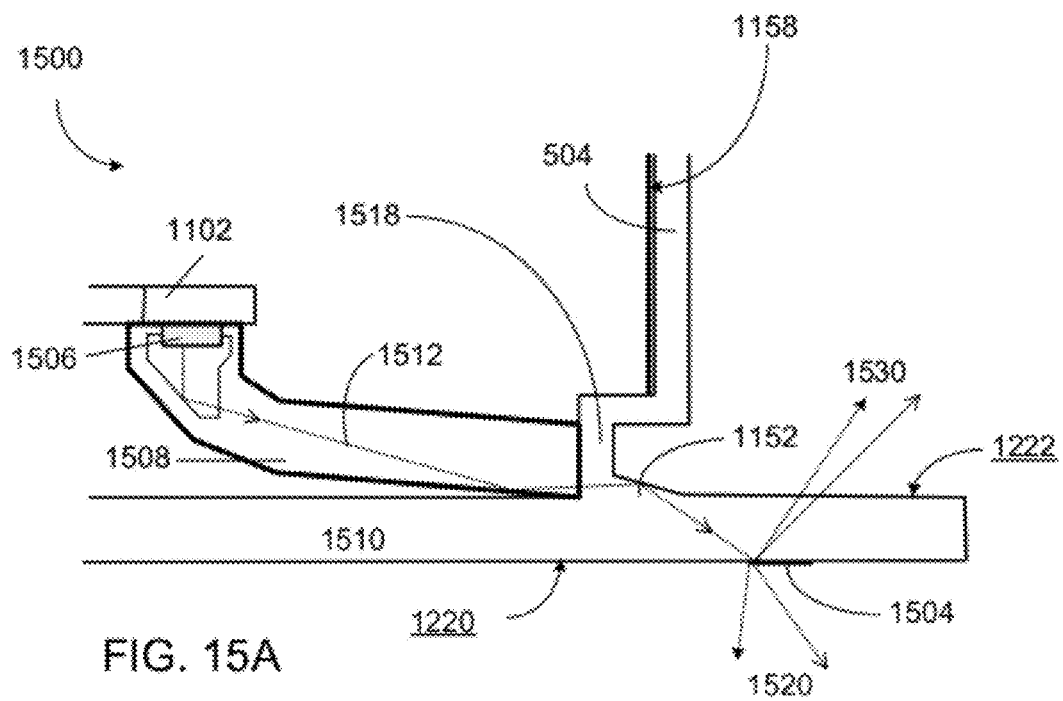
FIG. 15A is a cross-section diagram showing status display of a network device using ultraviolet ("UV") light and UV inked status indicator in accordance with one embodiment of the present invention.

FIG. 15A is a cross-section diagram 1500 showing status display of a network device using UV light and UV inked status indicator in accordance with one embodiment of the present invention. Diagram 1500, which is similar to diagram 1200 shown in FIG. 12A, includes LED 1506, PCB 1102, light conduit 1508, base plate 1510, prism 1152, light diffuser 1518, and vertical viewing surface 504. Light beam 1512, in one embodiment, is calibrated to project a column of illuminating light onto UV inked status indicators 1504. In one embodiment, UV inked status indicators 1504 are printed on bottom surface 1220 of base plate 1510 wherein the indicators become visible when they are illuminated by UV light 1512. It should be noted that UV inked status indicators 1504 can also be printed on top surface 1222 of base plate 1510 or in the middle of base plate 1510. In one aspect, different UV inked status indicators 1504 can be printed in places, such as top surface 1222, bottom surface 1220, and/or middle of base plate 1510.

UV light source 1506 controlled by controllers mounted on PCB 1102 emits UV light or UV electromagnetic waves to illuminate specific UV inked status indicators 1504. Similar to optical illumination as discussed earlier, UV light can be calibrated similar to optical light beams and travels through light conduit 1508 to reach its destination. UV light 1512, for example, travels through light conduit 1508, diffuser 1518, and prism 1152 and reaches an illuminating area having UV inked status indicators 1504. Note that a portion of UV light 1520 exits from bottom surface 1220 while another portion of UV light 1530 exits from top surface 1222 of base plate 1510.

When UV light strikes UV inked icons 1504, system status displayed by UV inked icons or indicators 1504 can be visible from bottom surface 1220 of base plate 1510. Depending on applications, system status displayed by UV inked icons 1504 may also be viewable from top surface 1222 of base plate 1510. Depending on applications, a wide angle of system status can have a viewable range of approximately 225 degrees.

Figure 15B:
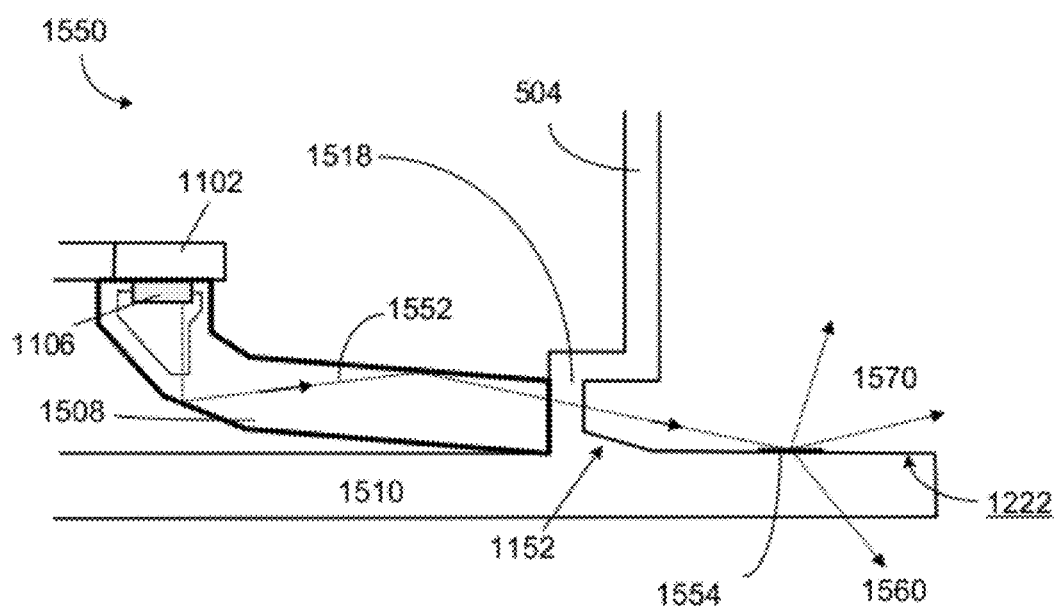
FIG. 15B illustrates a UV light which is calibrated and guided to project the UV light onto top surface of base plate in accordance with one embodiment of the invention.

FIG. 15B, similar to FIG. 15A, illustrates a UV light which is calibrated and guided to project the UV light onto top surface 1222 instead of bottom surface 1220 as discussed in FIG. 15A. Since base plate 1510 is made of OTST materials, status displayed by UV inked icons 1154 may be visible from both top surface and bottom surface of base plate 1510. An advantage of using UV light is to provide visual effect without visible light. UV inked icons or indicators 1554 printed or inked on base plate 1510 are invisible under the normal condition, and these icons 1554 become visible when they are illuminated by UV light.

It should be noted that, besides UV ink and light source, other types of electromagnetic-wave-sensitive inks and sources can be used for displaying performance status using similar approach as described above.

Figure 16:
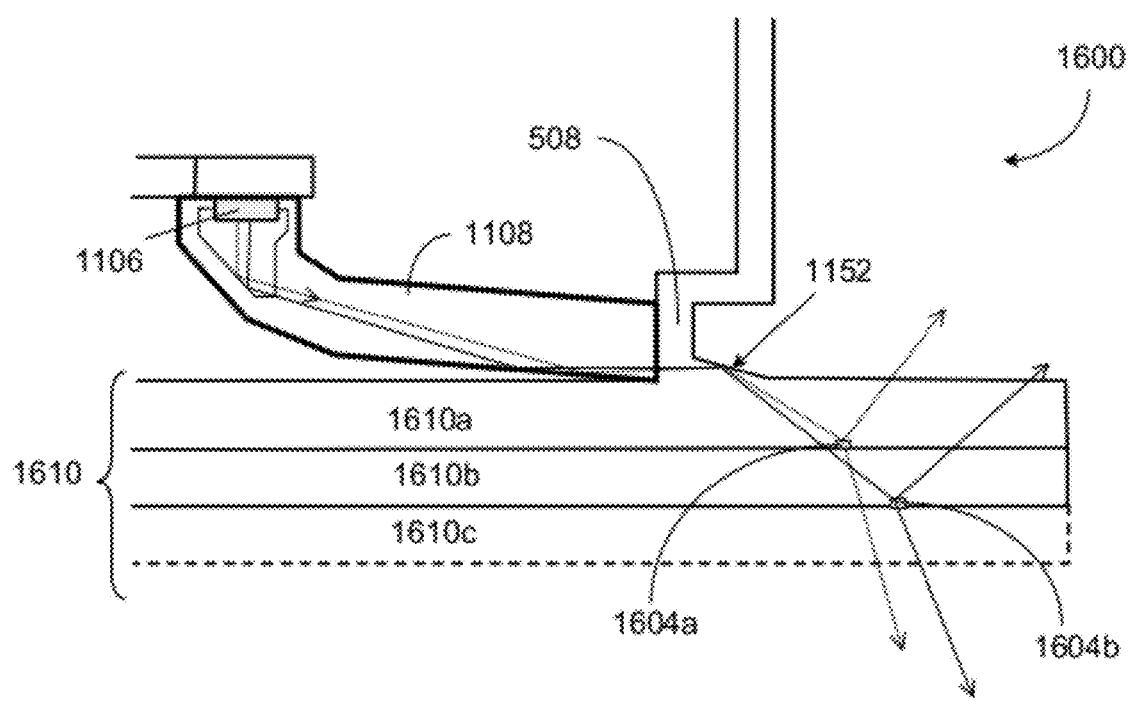
FIG. 16 is a diagram illustrating a status display using UV light with multiple sub-layers of UV inked icons in accordance with one embodiment of the present invention.

FIG. 16, similar to FIG. 15A, illustrates a status display using UV light with multiple sub-layers of UV inked icons in accordance with one embodiment of the present invention. Diagram 1600 is a cross-section diagram illustrating a network device having a multi-layered base plate with a wide viewing angle for displaying performance status. Diagram 1600 include a light source 1106, a light guide 1108 a light diffuser 508 with optical prism 1152 and a multi-layered base plate 1610. Base plate 1610 includes multiple sub-layers 1610a-1610c wherein each sub-layer may include one or more status indicators inked by one type of UV ink.

In one embodiment, each sub-layer is printed with multiple UV inked icons indicating system status wherein different UV inks are used for different sub-layers. Each type of UV ink is configured to response to one type of UV light. As such, different UV light illuminates different groups of UV inked icons situated in different sub-layers. For example, UV inked icons 1604a are configured to be illuminated by a first type of UV light, and UV inked icons 1604b are configured to be illuminated by a second type of UV light. Since one type of UV light affects one type of UV inked icons situated in one sub-layer, UV inked icons can be printed one on top of another in different sub-layers to conserve the space. Depending on the status, appropriate UV light is selected to illuminate a specific set of UV inked icons.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 17:
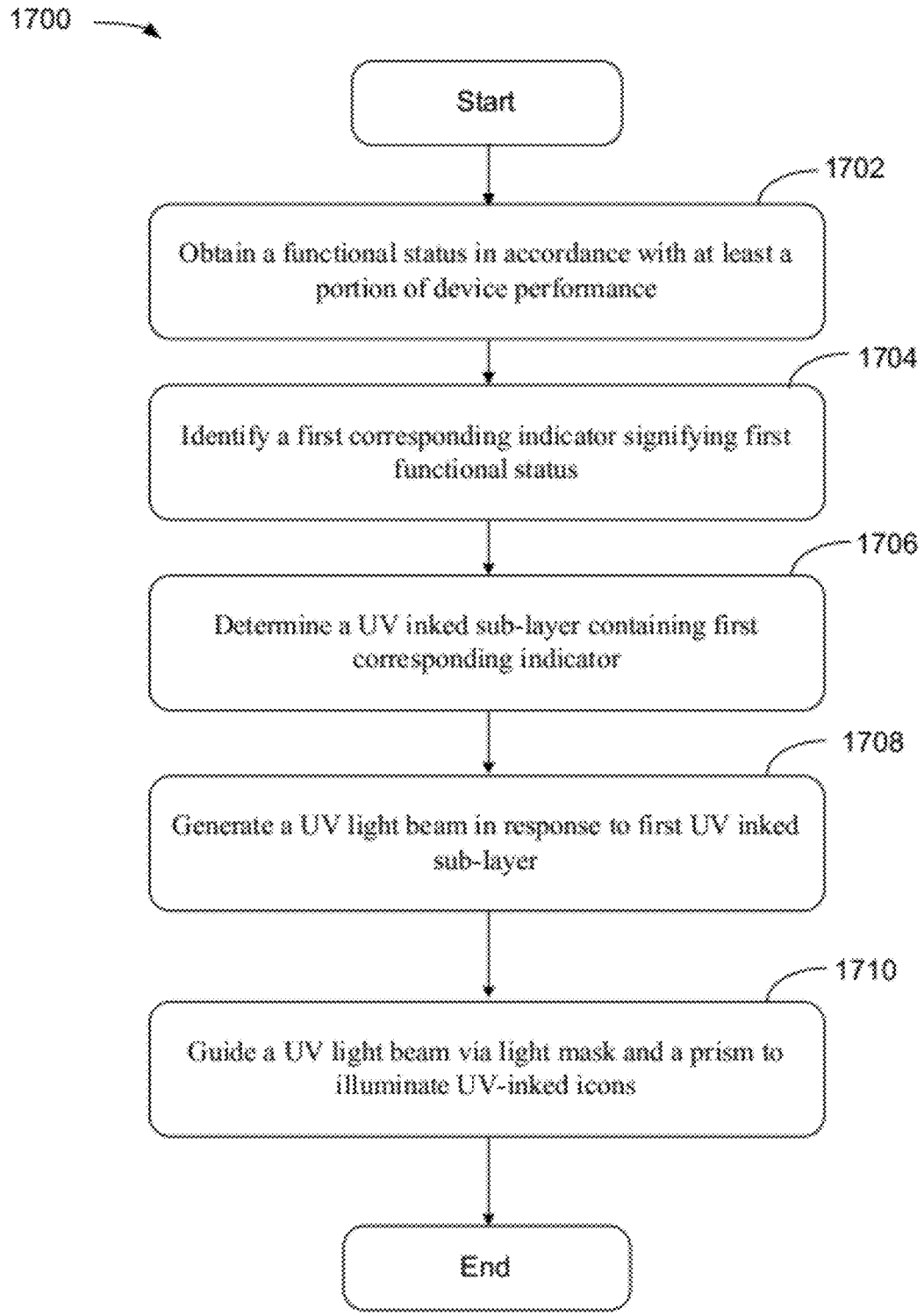
FIG. 17 is a flowchart illustrating a process of displaying status with a wide viewing angle using VU light in accordance with one embodiment of the present invention.

FIG. 17 is a flowchart 1700 illustrating a process of displaying status with a wide viewing angle using VU light in accordance with one embodiment of the present invention. At block 1702, a process capable of displaying system status obtains a first functional status in accordance with at least a portion of device performance. For example, the process is capable of identifying a signal indicating bandwidth of communication.

At block 1704, the process identifies an indicator corresponding to the first function status. For example, a "2.4 GHz" icon may be used to indicate a speed of data transmission at a frequency of 2.4 GHz. At block 1706, UV inked sub-layer containing the first corresponding indicator is determined, and the corresponding first UV light, at block 1708, is generated in accordance with the first UV inked sub-layer.

At block 1710, the process guides the first UV light beam via a light diffuser and optical prism to illuminate UV inscribed or inked corresponding indicator. In one embodiment, upon obtaining a second functional status in accordance with at least a portion of device performance, a second corresponding indicator is identified to signify the second functional status. After determining a second UV inked sub-layer containing the second corresponding indicator, a second UV light beam is generated from a second light source in response to the second UV inked sub-layer. The process is capable of guiding a second UV light beam via the optical guiding channel to illuminate UV inscribed second corresponding indicator.

Figure 18A:
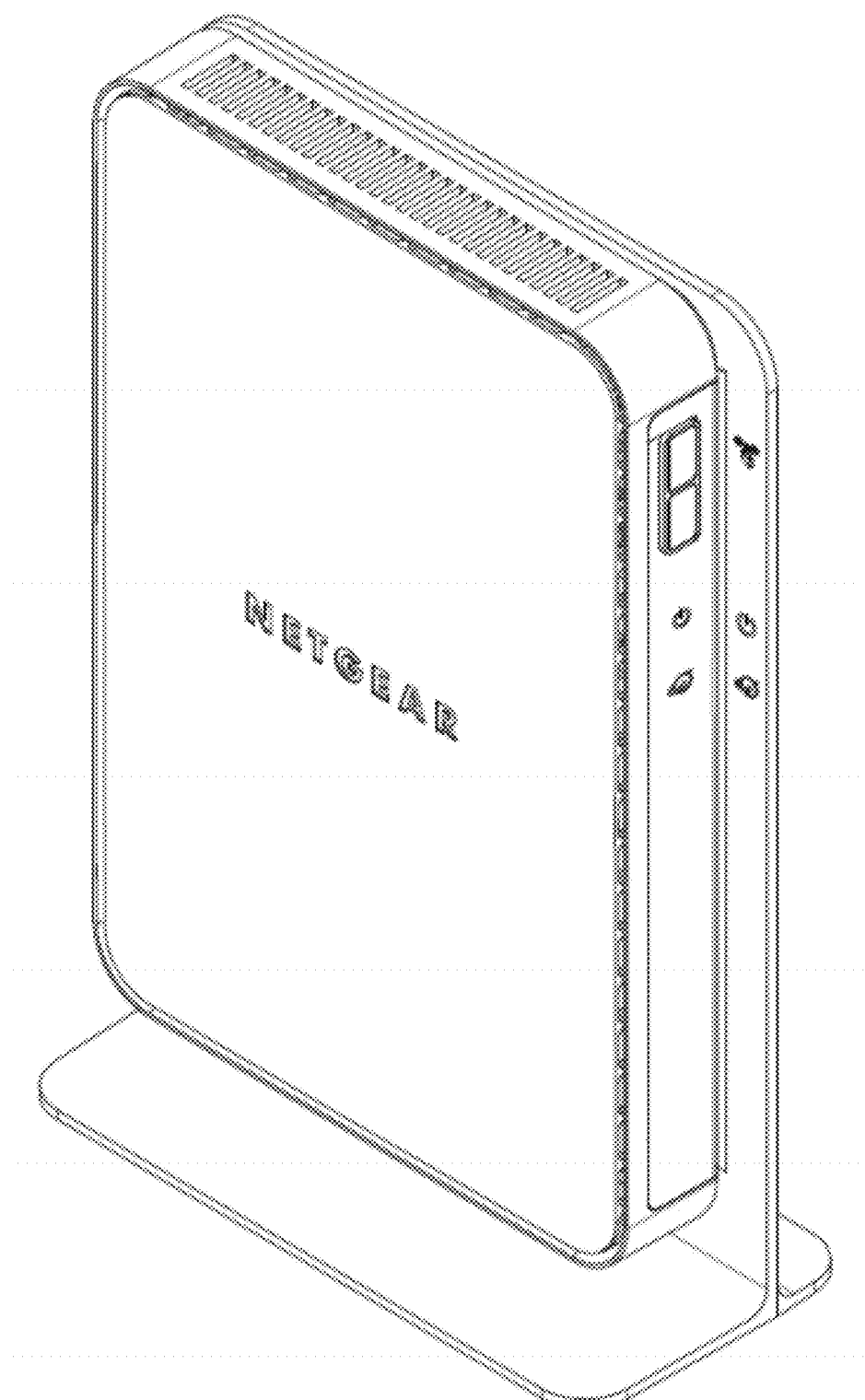
FIGS. 18A-C illustrate perspective views of a device layout capable of displaying device status with wide viewable angle using an OTST plate in accordance with one embodiment of the present invention.
Figure 18B:
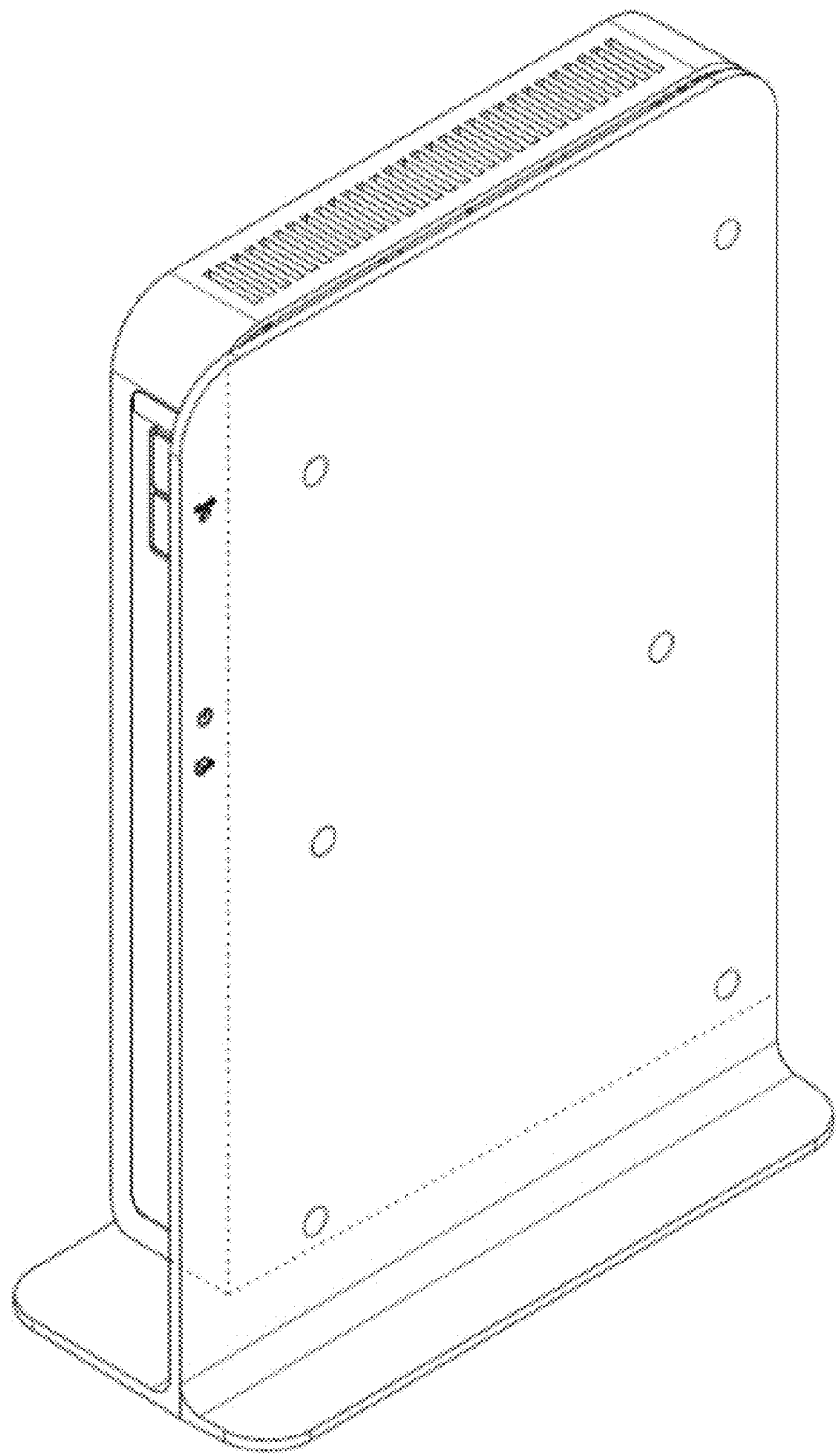
Figure 18C:
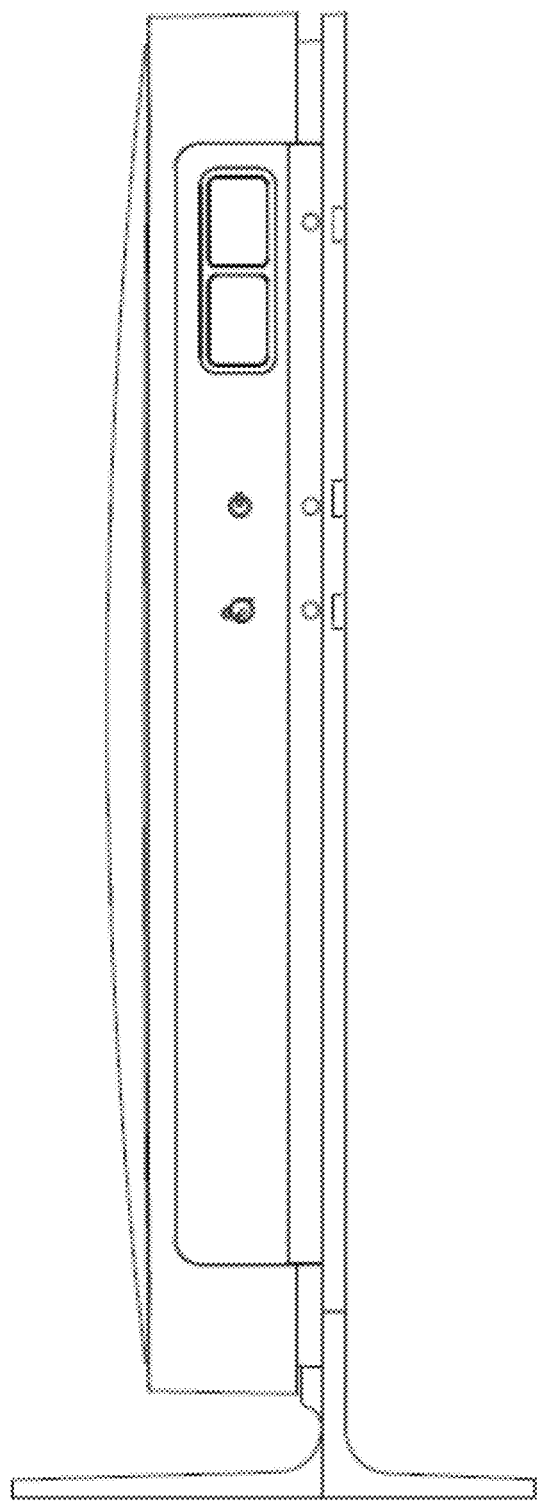

FIGS. 18A-C illustrate a set of 3D device layouts capable of displaying device status with a wide viewing angle using an OTST plate in accordance with one embodiment of the present invention.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A network device, comprising: an optical transparent or semitransparent ("OTST") plate having a first surface and a second surface, wherein the second surface includes a plurality of first ultraviolet ("UV") inked icons indicating status associated with the network device, wherein at least one of the plurality of first UV inked icons is visible from the second surface in response to a first UV light; an optical diffuser coupled to the first surface of the OTST plate and allowing at least a portion of UV light beam traveling through the optical diffuser becoming at least a portion of the first UV light; and an optical prism coupled with the optical diffuser and the first surface of the OTST plate, and configured to guide at least a portion of first UV light from the optical diffuser passing through medium of the OTST plate, and allow the portion of diffusing light to illuminate at least one of the first UV inked icons as the first UV light exits from the second surface;

wherein the edge lip of the first plate includes multiple sub-layers wherein one of the multiple sub-layers is the first graphic viewing surface; wherein the first plate is bottom plate of the system and wherein the second plate is front plate of the system.

2. The device of claim 1, wherein the optical prism provides an optical passage between the optical diffuser and the second surface of the OTST plate for the first UV light to illuminate at least a portion of the plurality of first UV inked icons on the second surface.

3. The device of claim 1, further comprising a light guide coupled to the optical diffuser and configured to facilitate transmitting light to the optical diffuser.

4. The device of claim 1, further comprising a first light source coupled to the light guide and configured to generate a light beam to illuminate at least one of the plurality of first UV inked icons on the second surface of the OTST plate.

5. The network device of claim 1, further comprising a second plate including a plurality of second UV inked icons showing performance status associated with the network device.

6. The network device of claim 5, further comprising a second light source configured to generate light beam to illuminate at least one of a plurality of the second UV inked icons on the second plate.

* * * * *